(12) United States Patent
Moon et al.

(10) Patent No.: US 12,118,696 B2
(45) Date of Patent: Oct. 15, 2024

(54) IMAGE SIGNAL PROCESSOR, METHOD FOR OPERATING IMAGE SIGNAL PROCESSOR AND IMAGE SENSING DEVICE

(71) Applicant: SAMSUNG ELECTRONICS CO., LTD., Suwon-si (KR)

(72) Inventors: So Jin Moon, Seoul (KR); Hyoung Seok Ko, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 384 days.

(21) Appl. No.: 17/827,101

(22) Filed: May 27, 2022

(65) Prior Publication Data

US 2023/0169629 A1 Jun. 1, 2023

(30) Foreign Application Priority Data

Nov. 26, 2021 (KR) .......................... 10-2021-0164986

(51) Int. Cl.
*G06K 9/00* (2022.01)
*G06T 5/70* (2024.01)
*G06T 5/73* (2024.01)
*H04N 25/60* (2023.01)
*G06T 5/20* (2006.01)

(52) U.S. Cl.
CPC .................. *G06T 5/70* (2024.01); *G06T 5/73* (2024.01); *H04N 25/60* (2023.01); *G06T 5/20* (2013.01); *G06T 2207/20192* (2013.01)

(58) Field of Classification Search
None
See application file for complete search history.

(56) References Cited

U.S. PATENT DOCUMENTS

| | | |
|---|---|---|
| 5,392,137 A | 2/1995 | Okubo |
| 8,433,153 B2 | 4/2013 | Nojima et al. |
| 9,390,478 B2 | 7/2016 | Lee et al. |
| 9,449,248 B1 | 9/2016 | Jain et al. |
| 9,489,720 B2 | 11/2016 | Oron et al. |
| 10,332,263 B2 | 6/2019 | Tanizaki et al. |
| 2006/0268174 A1 | 11/2006 | Obara et al. |
| 2016/0117807 A1* | 4/2016 | Matsumoto ............... G06T 5/94 382/261 |
| 2021/0233218 A1 | 7/2021 | Osawa |

FOREIGN PATENT DOCUMENTS

| | | |
|---|---|---|
| KR | 20060055776 A | 5/2006 |
| KR | 101846743 B1 | 4/2018 |

* cited by examiner

*Primary Examiner* — S J Park
(74) *Attorney, Agent, or Firm* — Fish & Richardson P.C.

(57) ABSTRACT

An image signal processor includes a gradation detection module configured to receive a pixel signal from an external device and a correction module configured to receive the pixel signal. The correction module is connected to the gradation detection module. The gradation detection module is configured to estimate a gradient of the pixel signal, correct the pixel signal based on the gradient to generate a corrected pixel signal, calculate a first variance value based on the pixel signal, calculate a second variance value based on the corrected pixel signal, calculate a gradation probability value based on a comparison result between the first variance value and the second variance value, and generate a gradation map as information about the gradation probability value of the pixel signal. The correction module is configured to correct the pixel signal based on the gradation map.

20 Claims, 26 Drawing Sheets

| G1 | R1 | G3 | R2 |
|----|----|----|----|
| B1 | G2 | B2 | G4 |
| G5 | R3 | G7 | R4 |
| B3 | G6 | B4 | G8 |

|     | PS1             | PS2             | PS3             |
| --- | --------------- | --------------- | --------------- |
| V   | V_PS1 (Small)   | V_PS2 (Large)   | V_PS3 (Large)   |
| V_C | V_PS1_C (Small) | V_PS2_C (Large) | V_PS3_C (Small) |
| GPR | GPR_PS1         | GPR_PS2         | GPR_PS3         |

GRM

420'

400'

420"

600

600'

100"

IMAGE SIGNAL PROCESSOR, METHOD FOR OPERATING IMAGE SIGNAL PROCESSOR AND IMAGE SENSING DEVICE

CROSS-REFERENCE TO RELATED APPLICATION

This application claims priority from Korean Patent Application No. 10-2021-0164986 filed on Nov. 26, 2021, in the Korean Intellectual Property Office and all the benefits accruing therefrom under 35 U.S.C. 119, the contents of which in their entirety are herein incorporated by reference.

BACKGROUND

Field

The present disclosure relates to an image signal processor, a method for operating an image signal processor, and an image sensing device.

Description of Related Art

An image sensing device refers to a semiconductor element that converts optical information into an electrical signal. The image sensing device may include a charge-coupled device (CCD) and a CMOS (complementary metal-oxide semiconductor) image sensing device.

The CMOS image sensor may be abbreviated as CIS (CMOS image sensor). The CIS may include a plurality of pixels arranged two-dimensionally. Each of the pixels may include, for example, a photodiode (PD). The photodiode may serve to convert incident light thereto into an electrical signal.

Recently, under development of the computer industry and the communication industry, demand for an image sensor with improved performance is increasing in various fields, such as a digital camera, a camcorder, a smartphone, a game device, a security camera, a medical micro camera, a robot, etc.

SUMMARY

Aspects of the present disclosure provide an image signal processor that improves image quality.

Aspects of the present disclosure also provide a method for operating an image signal processor that improves image quality.

Aspects of the present disclosure also provide an image sensing device that improves image quality.

Aspects of the present disclosure also provide an electronic device with reduced power consumption.

However, aspects of the present disclosure are not limited to the above-mentioned purpose. Other purposes and advantages according to the present disclosure that are not mentioned may be understood based on following descriptions and may be more clearly understood based on embodiments according to the present disclosure. Further, it will be easily understood that the purposes and advantages according to the present disclosure may be realized using means shown in the claims and combinations thereof.

According to an aspect of the present disclosure, there is provided an image signal processor including a gradation detection module configured to receive a pixel signal from an external device and a correction module configured to receive the pixel signal. The correction module is connected to the gradation detection module. The gradation detection module is configured to estimate a gradient of the pixel signal, correct the pixel signal based on the gradient to generate a corrected pixel signal, calculate a first variance value based on the pixel signal, calculate a second variance value based on the corrected pixel signal, calculate a gradation probability value based on a comparison result between the first variance value and the second variance value, and generate a gradation map as information about the gradation probability value of the pixel signal. The correction module is configured to correct the pixel signal based on the gradation map.

According to another aspect of the present disclosure, there is provided an image sensing device including an image sensor including different first to third areas. An image signal processor is configured to receive a first pixel signal generated from the first area, a second pixel signal generated from the second area, and a third pixel signal generated from the third area. The image signal processor is configured to: (1) perform correction on the first pixel signal to generate a first corrected pixel signal, perform correction on the second pixel signal to generate a second corrected pixel signal, and perform correction on the third pixel signal to generate a third corrected pixel signal; (2) calculate a first pixel signal variance value based on the first pixel signal, calculate a second pixel signal variance value based on the second pixel signal, and calculate a third pixel signal variance value based on the third pixel signal; (3) calculate a first corrected pixel signal variance value based on the first corrected pixel signal, calculate a second corrected pixel signal variance value based on the second corrected pixel signal, and calculate a third corrected pixel signal variance value based on the third corrected pixel signal; and (4) calculate a first gradation probability value based on a comparison result between the third pixel signal variance value and the third corrected pixel signal variance value.

According to another aspect of the present disclosure, there is provided a method for operating an image signal processor. The method includes: (1) receiving a first pixel signal including a plurality of first pixel values, a second pixel signal including a plurality of second pixel values, and a third pixel signal including a plurality of third pixel values; (2) estimating a first gradient of the first pixel values, estimating a second gradient of the second pixel values, and estimating a third gradient of the third pixel values; (3) correcting the first pixel values based on the first gradient to generate first corrected pixel values, correcting the second pixel values based on the second gradient to generate second corrected pixel values, and correcting the third pixel values based on the third gradient to generate third corrected pixel values, (4) generating a first variance value based on the first pixel values, generating a second variance value based on the second pixel values, and generating a third variance value based on the third pixel values; (5) generating a fourth variance value based on the first corrected pixel values, generating a fifth variance value based on the second corrected pixel values, and generating a sixth variance value based on the third corrected pixel values; and (6) determining the first pixel signal as a flat area based on a comparison result between the first variance value and the fourth variance value, determining the second pixel signal as an edge area based on a comparison result between the second variance value and the fifth variance value, and determining the third pixel signal as a gradation area based on a comparison result between the third variance value and the sixth variance value.

Other features and embodiments may be apparent from the following detailed description, the drawings, and the claims.

BRIEF DESCRIPTION OF DRAWINGS

The above and other aspects and features of the present disclosure will become more apparent by describing in detail exemplary embodiments thereof with reference to the attached drawings, in which:

FIG. 4 is a diagram for illustrating a pixel array of FIG. 3.

FIG. 13 is a table of a gradation probability value calculated based on a comparison result of variance values with corrected variance values in FIG. 12.

DETAILED DESCRIPTIONS

Figure 1:
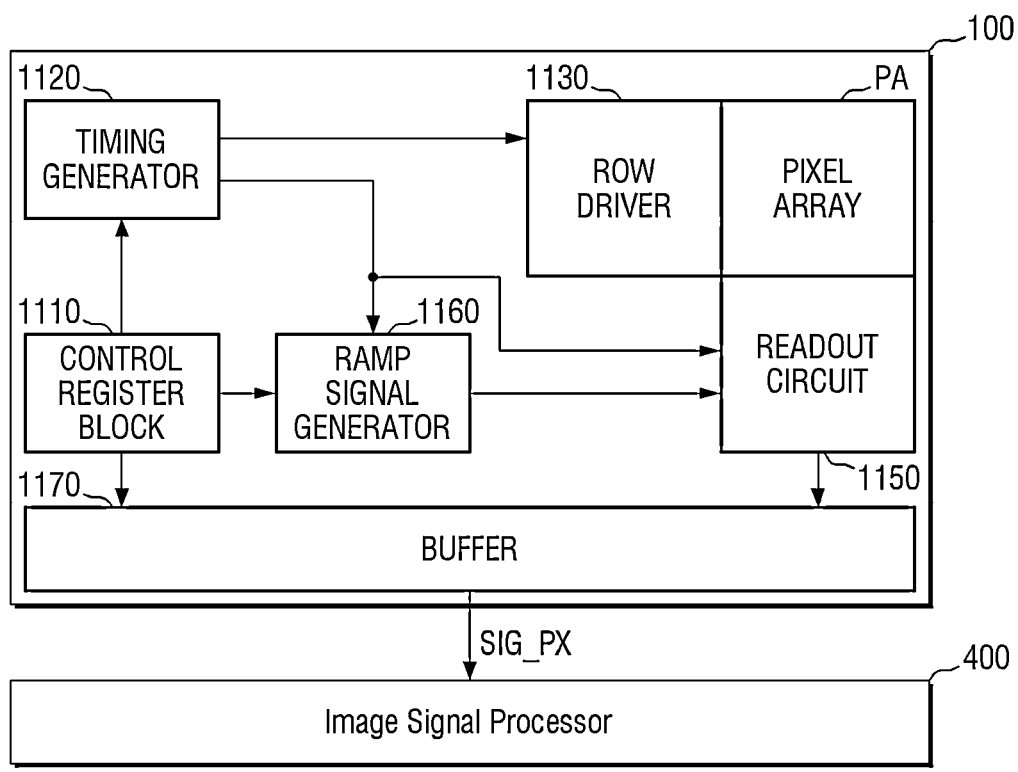
FIG. 1 is a block diagram of an image sensing device according to embodiments.

Hereinafter, embodiments of the present disclosure will be described in detail with reference to the accompanying drawings. The same reference numerals are used for the same components in the drawings and duplicate descriptions thereof are omitted.

FIG. 1 is a block diagram of an image sensing device according to embodiments.

Referring to FIG. 1, an image sensing device 1 may include an image sensor 100 and an image signal processor 400.

The image sensor 100 may sense an image of a sensing target using light to generate a pixel signal SIG_PX. In embodiments, the generated pixel signal SIG_PX may be, for example, a digital signal. An embodiment according to the technical idea of the present disclosure is not limited thereto.

The pixel signal SIG_PX may be provided to the image signal processor 400 in which the pixel signal is processed. The image signal processor 400 may receive the pixel signal SIG_PX output from a buffer 1170 of the image sensor 100 and process the received pixel signal SIG_PX for display.

In embodiments, the image signal processor 400 may perform digital binning on the pixel signal SIG_PX output from the image sensor 100. In this regard, the pixel signal SIG_PX output from the image sensor 100 may be a raw image signal from the pixel array PA not subjected to analog binning or may be a pixel signal SIG_PX subjected to the analog binning.

In embodiments, the image sensor 100 and the image signal processor 400 may be disposed separately from each other as shown. For example, the image sensor 100 may be mounted on a first chip, while the image signal processor 400 may be mounted on a second chip. The image sensor 100 and the image signal processor 400 may communicate with each other over a predefined interface. However, embodiments are not limited thereto. The image sensor 100 and the image signal processor 400 may be implemented as one package, for example, an MCP (multi-chip package).

The image sensor 100 may include a control register block 1110, a timing generator 1120, a row driver 1130, a pixel array PA, a read-out circuit 1150, a ramp signal generator 1160, and the buffer 1170.

The control register block 1110 may control all operations of the image sensor 100. In particular, the control register block 1110 may directly transmit a control signal to the timing generator 1120, the ramp signal generator 1160, and the buffer 1170.

The timing generator 1120 may generate a signal that acts as a reference signal for operation timing of various components of the image sensor 100. The reference signal for the operation timing as generated by the timing generator 1120 may be transmitted to the row driver 1130, the read-out circuit 1150, the ramp signal generator 1160, and the like.

The ramp signal generator 1160 may generate and transmit a ramp signal to the read-out circuit 1150. For example, the read-out circuit 1150 may include a correlated double sampler (CDS), a comparator, etc. The ramp signal generator 1160 may generate the ramp signal used in the correlated double sampler (CDS), the comparator, and the like and transmit the ramp signal thereto.

The buffer 1170 may include, for example, a latch unit. The buffer 1170 may temporarily store therein the pixel signal SIG_PX to be provided outside and may transmit the pixel signal SIG_PX to an external memory or an external device. The buffer 1170 may include a memory such as DRAM or SRAM.

The pixel array PA may sense an external image. The pixel array PA may include a plurality of pixels (or unit pixels). The row driver 1130 may selectively activate a row of the pixel array PA.

The read-out circuit 1150 samples the pixel signal provided from the pixel array PA, compares the sampled pixel signal with the ramp signal, and then converts an analog image signal (data) into a digital image signal (data) based on the comparison result.

Figure 2:
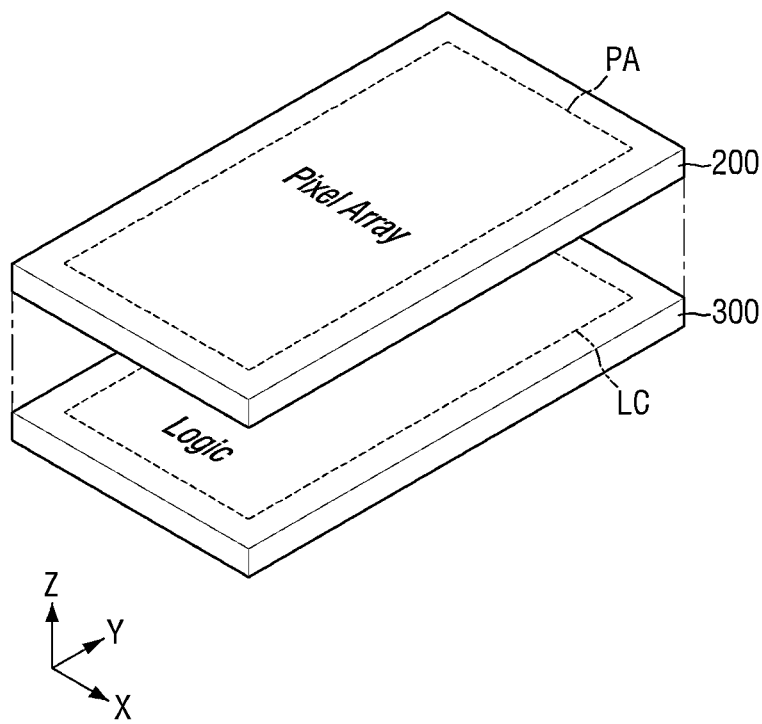
FIG. 2 is a diagram for illustrating a conceptual layout of an image sensor according to embodiments.

FIG. 2 is a diagram for illustrating a conceptual layout of an image sensor according to embodiments.

Referring to FIG. 2, an image sensor 100 according to this embodiment may include an upper chip 200 and a lower chip 300 as stacked vertically. A plurality of pixels may be disposed in the upper chip 200 and in a two-dimensional array structure. That is, the upper chip 200 may include the pixel array PA. The lower chip 300 may include a logic area LC and a memory area. The lower chip 300 may be disposed below the upper chip 200 and may be electrically connected to the upper chip 200. The lower chip 300 may receive the pixel signal from the upper chip 200 and transmit the pixel signal to the logic area LC of the lower chip.

Logic elements may be disposed in the logic area LC of the lower chip 300. The logic elements may include circuits for processing the pixel signal from the pixels. For example, the logic elements may include the control register block 1110, the timing generator 1120, the row driver 1130, the read-out circuit 1150, the ramp signal generator 1160, or the like in FIG. 1.

Figure 3:
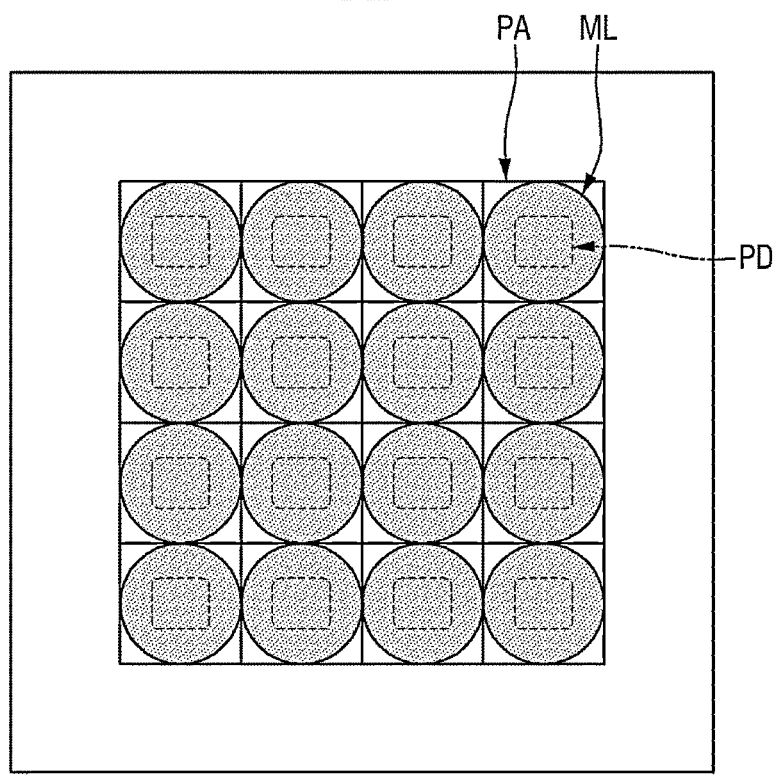
FIG. 3 is a top view of an image sensor according to embodiments.
Figure 4:
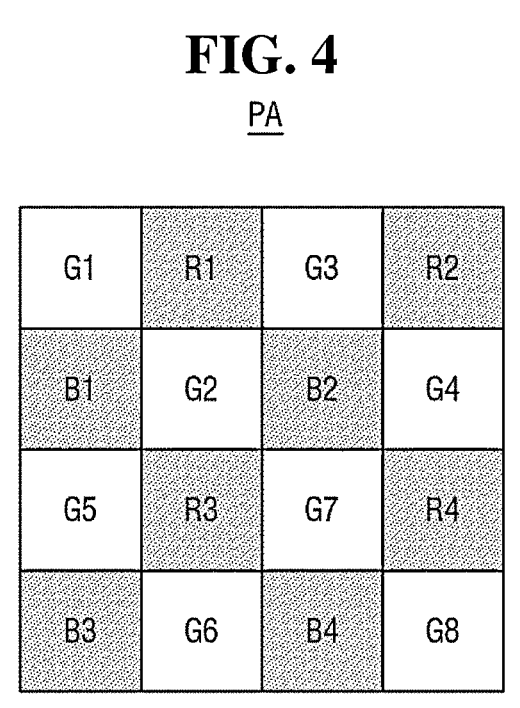

FIG. 3 is a top view of an image sensor according to embodiments. FIG. 4 is a diagram for illustrating a pixel array of FIG. 3.

Referring to FIG. 3, a pixel array PA may be disposed in a top face of the image sensor 100. In detail, the pixel array PA may be disposed in a top face of the upper chip 200 of the image sensor 100. The pixel array PA may receive incident light. In this regard, the pixel array PA may include a photo diode PD and a micro lens ML disposed in each pixel. The photo diode PD may be disposed in a substrate that is included in the pixel array PA. The photo diode PD may act as a photoelectric conversion unit and may convert light incident on the pixel array PA into electric charges. The micro lens ML may be disposed on each photo diode PD. That is, the micro lens ML may be disposed in each pixel of the pixel array PA and may receive light. Light passing through the micro lens ML may be transmitted to the photo diode PD. In this drawing, the pixels of the pixel array PA are shown as being regularly arranged in a first direction X and a second direction Y. However, an embodiment of the present disclosure is not limited thereto.

Referring to FIG. 4, the pixel array PA may include first to eighth green pixels G1 to G8, first to fourth blue pixels B1 to B4 and first to fourth red pixels R1 to R4. A plurality of pixels of the pixel array PA may be arranged in an RGB Bayer pattern. For example, the green pixels including the first to eighth green pixels G1 to G8 may surround each of the blue pixels including the first to fourth blue pixels B1 to B4 and surround each of the red pixels including the first to fourth red pixels R1 to R4. Thus, the plurality of pixels of the pixel array PA may be regularly arranged. In addition, an embodiment of the present disclosure is not limited thereto. The pixels of the pixel array PA may be arranged in an RGB tetra or nona pattern. Further, the pixels of the pixel array PA may be arranged in a YUV pattern.

The first to eighth green pixels G1 to G8 may output first to eighth green pixel signals corresponding thereto, respectively. The first to fourth blue pixels B1 to B4 may output first to fourth blue pixel signals corresponding thereto, respectively. The first to fourth red pixels R1 to R4 may output first to fourth red pixel signals corresponding thereto, respectively. That is, an image signal or a pixel signal SIG_PX of one frame output from the pixel array PA may include the first to eighth green pixel signals, the first to fourth blue pixel signals, and the first to fourth red pixel signals.

However, an embodiment of the present disclosure is not limited thereto. The pixel signal SIG_PX output from the pixel array PA may include an image signal of a YUV pattern.

Figure 5:
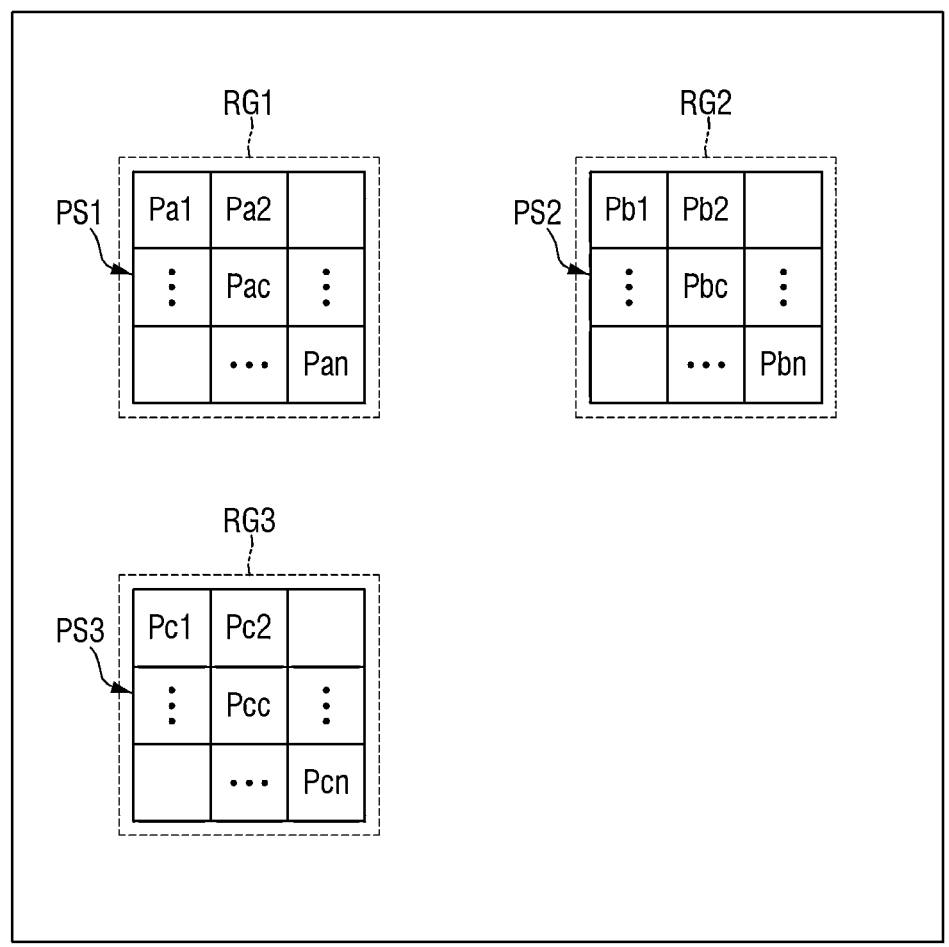
FIG. 5 is a diagram of a pixel signal according to embodiments.
Figure 6:
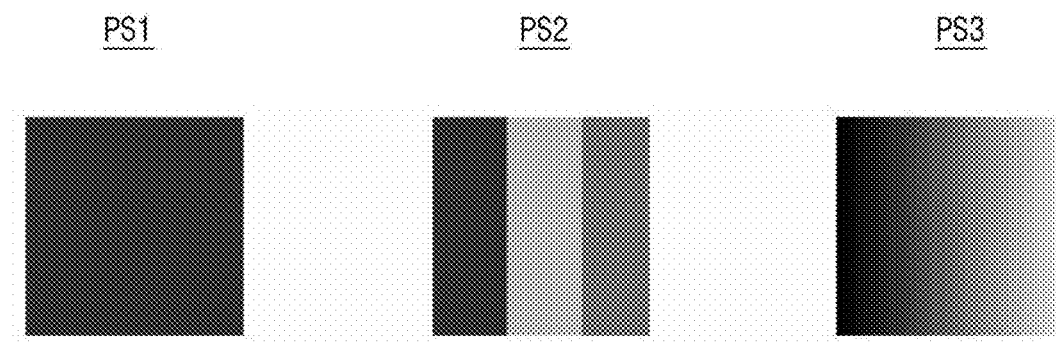
FIG. 6 is a diagram of first to third pixel signals respectively output from first to third areas of FIG. 5.
Figure 7:
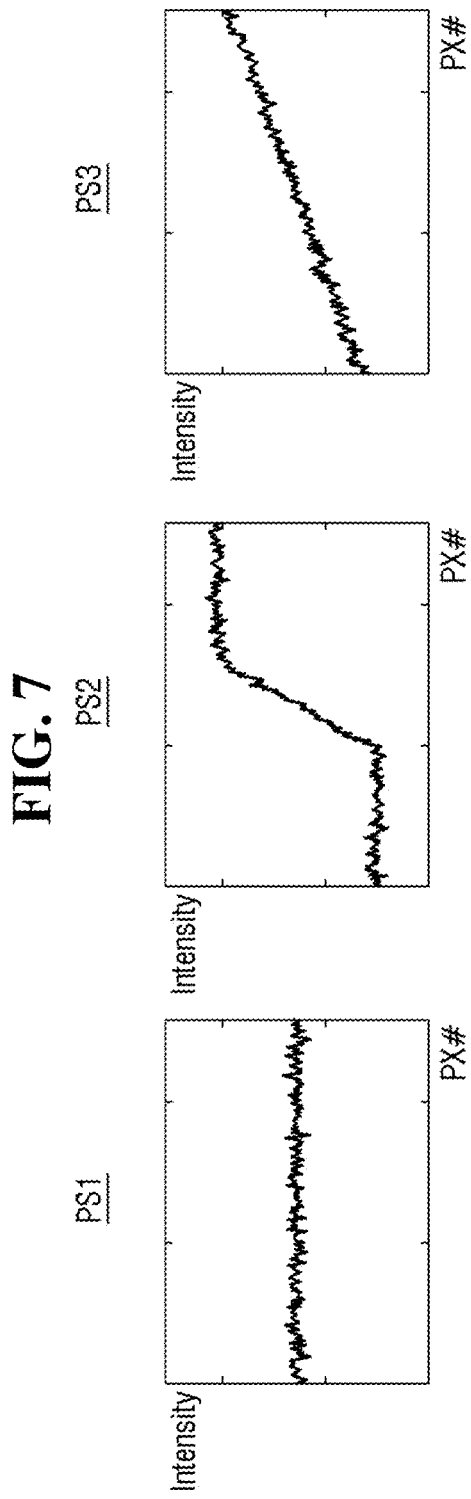
FIG. 7 is a diagram for illustrating pixel values of first to third pixel signals of FIG. 6.

FIG. 5 is a diagram of a pixel signal according to embodiments. FIG. 6 is a diagram of first to third pixel signals respectively output from first to third areas of FIG. 5. FIG. 7 is a diagram for illustrating pixel values of first to third pixel signals of FIG. 6.

Referring to FIG. 5, the pixel signal SIG_PX may include a first pixel signal PS1, a second pixel signal PS2, and a third pixel signal PS3. In this regard, the first pixel signal PS1 may correspond to a pixel signal generated and output from a first area RG1 of the pixel array PA. Further, the second pixel signal PS2 may correspond to a pixel signal generated and output from a second area RG2 of the pixel array PA. The third pixel signal PS3 may correspond to a pixel signal generated and output from a third area RG3 of the pixel array PA. In this regard, the first to third areas RG1 to RG3 may be examples. Further, the first to third areas RG1 to RG3 may mean an area corresponding to the pixel signal SIG_PX.

The pixel signal SIG_PX may correspond to an image signal of one frame output from the image sensor 100. That is, the pixel signal SIG_PX may include the first to third pixel signals PS1 to PS3 simultaneously output from the image sensor 100. The pixel signal SIG_PX may be corrected by the image signal processor 400 and output to a display.

In embodiments, the first pixel signal PS1 may include first to n-th pixel values Pa1 to Pan and a center pixel value Pac. In this regard, the center pixel value Pac may correspond to a central portion of the first area RG1 corresponding to the first pixel signal PS1. The first to n-th pixel values Pa1 to Pan may correspond to a surrounding area around the center pixel value Pac. In this regard, the center pixel value Pac may correspond to a pixel value acting as a reference for correction in the first pixel signal PS1. Details thereof will be described later.

The second pixel signal PS2 may include first to n-th pixel values Pb1 to Pbn and a center pixel value Pbc. In this regard, the center pixel value Pbc may correspond to a central portion of the second area RG2 corresponding to the second pixel signal PS2. The first to n-th pixel values Pb1 to Pbn may correspond to a surrounding area around the center pixel value Pbc. In this regard, the center pixel value Pbc may correspond to a pixel value acting as a reference for correction in the second pixel signal PS2. The third pixel signal PS3 may include first to n-th pixel values Pc1 to Pcn and a center pixel value Pcc. In this regard, the center pixel value Pcc may correspond to a central portion of the third area RG3 corresponding to the third pixel signal PS3. The first to n-th pixel values Pc1 to Pcn may correspond to a surrounding area around the center pixel value Pcc. In this regard, the center pixel value Pcc may correspond to a pixel value acting as a reference for correction in the third pixel signal PS3.

Referring to FIG. 6 and FIG. 7, the first pixel signal PS1 may correspond to a flat area. That is, the first pixel signal PS1 may be output from pixels having relatively uniform pixel values. Further, the first area RG1 may correspond to a flat area. For example, pixel values output from pixels arranged along the first direction X in the first area RG1 may be substantially uniform. That is, the first pixel signal PS1 may not include pixel values having large differences therebetween.

The second pixel signal PS2 may correspond to an edge area. The second pixel signal PS2 may include pixel values having relatively large differences therebetween. That is, the second pixel signal PS2 may have different brightness. Further, the second area RG2 may correspond to an edge area. A difference between pixel values output from pixels arranged along the first direction X in the second area RG2 may be relatively large.

The third pixel signal PS3 may correspond to a gradation area. The third pixel signal PS3 may include gradually increasing pixel values. The third pixel signal PS3 may include gradually brighter pixel values. The third area RG3 may correspond to the gradation area. Pixel values output from pixels arranged along the first direction X in the third area RG3 may gradually increase and may not increase relatively rapidly.

In summary, the first pixel signal PS1 may correspond to the flat area. The second pixel signal PS2 may correspond to the edge area. The third pixel signal PS3 may correspond to the gradation area. That is, the pixel signal SIG_PX may include all of the flat area, the edge area, and the gradation area. In this regard, the gradation area may correspond to an image obtained by capturing a face of an object, an inclined plane, etc. The image signal processor 400 may divide the pixel signal SIG_PX into the flat area, the edge area, and the gradation area. Further, the image signal processor 400 may correct the pixel signal SIG_PX based on the divided areas to improve quality of an output image signal. A more detailed description thereof will be described below.

Figure 8:
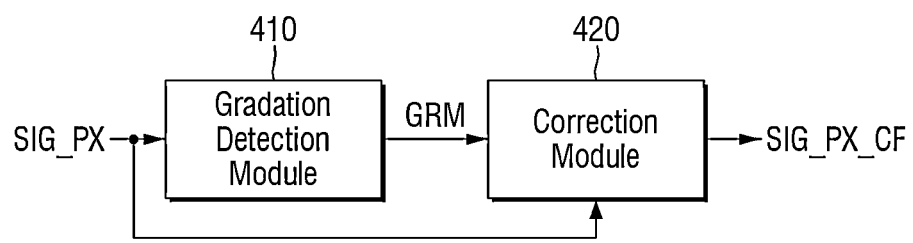
FIG. 8 is a block diagram of an image signal processor according to embodiments.

FIG. 8 is a block diagram of an image signal processor according to embodiments.

Referring to FIG. 8, the image signal processor 400 may include a gradation detection module 410 and a correction module 420. The gradation detection module 410 may receive the pixel signal SIG_PX from the image sensor 100 and may generate a gradation map GRM based on the pixel signal SIG_PX. The gradation map GRM may include a probability corresponding to the gradation area in the pixel signal SIG_PX.

The correction module 420 may receive the pixel signal SIG_PX from the image signal processor 400 and may receive the gradation map GRM from the gradation detection module 410. The correction module 420 may correct the pixel signal SIG_PX based on the gradation map GRM to generate a final corrected pixel signal SIG_PX_CF. That is, the final corrected pixel signal SIG_PX_CF may be a result of performing correction on pixel values included in the gradation area corresponding to the gradation map GRM. Accordingly, noise of the final corrected pixel signal SIG_PX_CF may be lowered compared to noise of the pixel signal SIG_PX.

Figure 9:
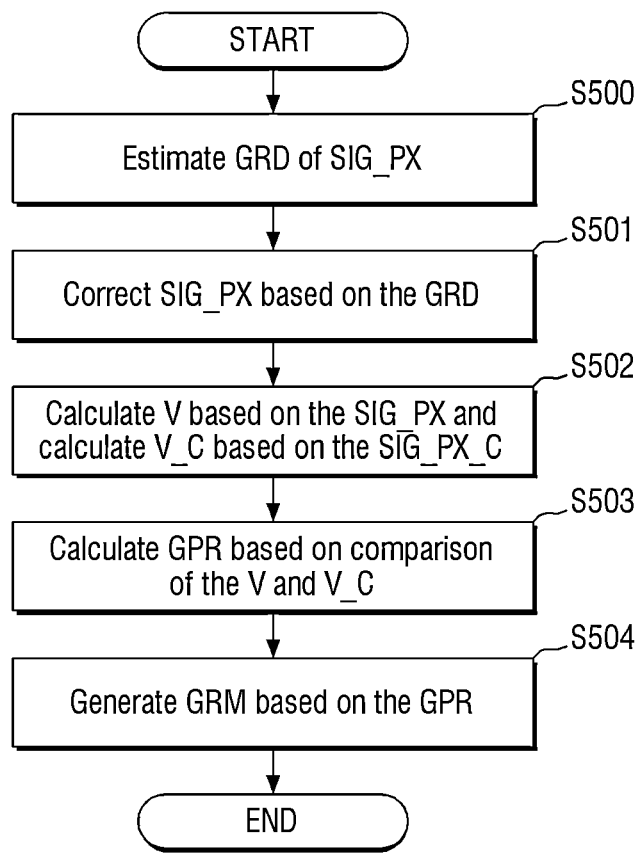
FIG. 9 is a flowchart for illustrating a method for operating a gradation detection module according to embodiments.
Figure 10:
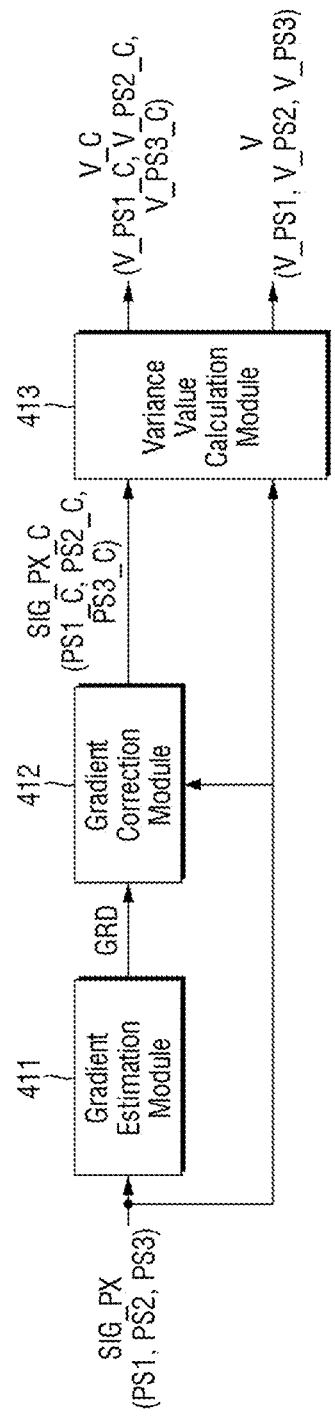
FIG. 10 is a block diagram of a gradation detection module for generating variance values according to embodiments.
Figure 11:
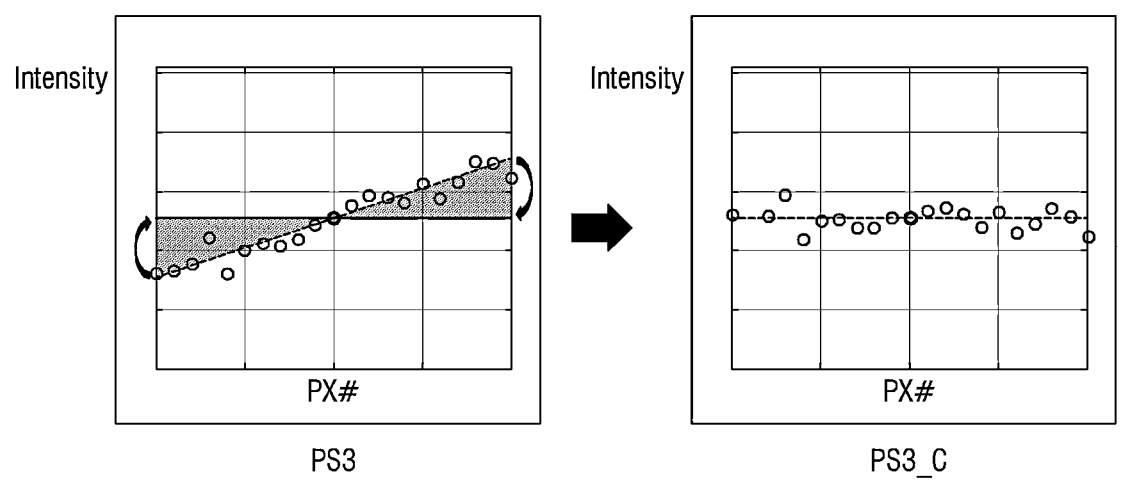
FIG. 11 is a diagram for illustrating a method for correcting a third pixel signal by the gradation detection module of FIG. 10.

FIG. 9 is a flowchart for illustrating a method for operating a gradation detection module according to embodiments. FIG. 10 is a block diagram of a gradation detection module for generating variance values according to embodiments. FIG. 11 is a diagram for illustrating a method for correcting a third pixel signal by the gradation detection module of FIG. 10.

Referring to FIG. 9 to FIG. 10, the gradation detection module 410 may estimate a gradient GRD of the pixel signal SIG_PX in S500. For example, a gradient estimation module 411 included in the gradation detection module 410 may estimate the gradient GRD of the pixel signal SIG_PX. In this regard, the gradient estimation module 411 may estimate the gradient GRD of each of the first to third pixel signals PS1 to PS3. The gradient GRD may mean a gradient of pixel values of a plurality of pixels.

Referring to FIG. 11, the third pixel signal PS3 may include a plurality of pixel values corresponding to the plurality of pixels. That is, the third pixel signal PS3 may include the first to n-th pixel values Pc1 to Pcn and the center pixel value Pcc as described with reference to FIG. 5. In this embodiment, the gradient GRD estimation is performed on the third pixel signal PS3 corresponding to the gradation area. However, an embodiment of the present disclosure is not limited thereto.

Pixel values output from pixels arranged in the first direction X around a center pixel outputting the center pixel value Pcc may be greater than the center pixel value Pcc. Further, pixel values output from pixels arranged in a direction opposite to the first direction X around the center pixel outputting the center pixel value Pcc may be smaller than the center pixel value Pcc. That is, the gradient GRD of the third pixel signal PS3 may correspond to a positive value. Further, the pixel values included in the third pixel signal PS3 may increase gradually along the first direction X, but may not increase rapidly along the first direction X.

The gradient estimation module 411 may use a following Equation 1 to generate a first gradient ax as a gradient GRD in the first direction X and may use a following Equation 2 to generate a second gradient ay as a gradient GRD in the second direction Y. In this regard, the first direction X and the second direction Y may intersect each other. However, an embodiment of the present disclosure is not limited thereto, and the first direction X and the second direction Y may not intersect each other.

$$a_x = \frac{\sum_{n \in \Omega} I_n(n_x - c_x)}{\sum_{n \in \Omega} (n_x - c_x)^2} \quad \langle \text{Equation 1} \rangle$$

$$a_y = \frac{\sum_{n \in \Omega} I_n(n_y - c_y)}{\sum_{n \in \Omega} (n_y - c_y)^2} \quad \langle \text{Equation 2} \rangle$$

In this regard, $I_n$ means a pixel value of an n-th pixel, and $n_x$ and $n_y$ respectively mean positions in an x-axis and a y-axis of the n-th pixel. $c_x$ and $c_y$ respectively mean positions in an x-axis and a y-axis of the center pixel. That is, $I_n$ of each of pixels may include the first to n-th pixel values Pc1 to Pcn and the center pixel value Pcc.

For example, the gradient estimation module 411 may estimate the gradient GRD of the third pixel signal PS3 using a linear regression model. FIG. 11 shows only estimating the gradient GRD of the third pixel signal PS3. However, the gradient estimation module 411 may estimate the gradient GRD of each of the first and second pixel signals PS1 and PS2. Further, estimated gradients GRD of the first to third pixel signals PS1 to PS3 may be different from each other. For example, the estimated gradient GRD of the second pixel signal PS2 may be greater than the estimated gradient GRD of each of the first and third pixel signals PS1 and PS3.

Referring back to FIG. 9 and FIG. 10, the gradation detection module 410 may correct the pixel signal SIG_PX based on the gradient GRD in S501. For example, a gradient correction module 412 may correct the first pixel signal PS1 based on the gradient GRD of the first pixel signal PS1, may correct the second pixel signal PS2 based on the gradient GRD of the second pixel signal PS2, and may correct the third pixel signal PS3 based on the gradient GRD of the third pixel signal PS3. Accordingly, the gradient correction module 412 may output a corrected pixel signal SIG_PX_C including a first corrected pixel signal PS1_C, a second corrected pixel signal PS2_C, and a third corrected pixel signal PS3_C.

Referring to FIG. 11, the gradient correction module 412 may correct the third pixel signal PS3 based on the gradient GRD of the third pixel signal PS3 to generate the third corrected pixel signal PS3_C. In this regard, the gradient correction module 412 may use a following Equation 3 to correct the third pixel signal PS3 based on the gradient GRD of the third pixel signal PS3.

$$I_n' = I_n - (a_x(n_x - c_x) + a_y(n_y - c_y))$$ ⟨Equation 3⟩

In this regard, $I_n'$ means a corrected pixel value of the n-th pixel.

The output third corrected pixel signal PS3_C may include pixel values substantially uniform along the first direction X or the second direction Y. That is, the gradient of the third corrected pixel signal PS3_C in the first direction X or the second direction Y may be smaller than the gradient of the third pixel signal PS3 in the first direction X or the second direction Y. In this embodiment, only the generation of the third corrected pixel signal PS3_C is shown. However, this may be equally applied to a correction operation for generation of each of the first and second corrected pixel signals PS1_C and PS2_C. However, the pixel values of each of the first and second corrected pixel signals PS1_C and PS2_C may be different from the pixel values of the third corrected pixel signal PS3_C.

Referring back to FIG. 9 and FIG. 10, the gradation detection module 410 may calculate a variance value V based on the pixel signal SIG_PX and may calculate a corrected variance value V_C based on the corrected pixel signal SIG_PX_C in S502. That is, a variance value calculation module 413 included in the gradation detection module 410 may calculate the variance value V based on the pixel signal SIG_PX and may calculate the corrected variance value V_C based on the corrected pixel signal SIG_PX_C. The variance value calculation module 413 may receive the pixel signal SIG_PX and the corrected pixel signal SIG_PX_C.

The variance value calculation module 413 may use a following Equation 4 to calculate the variance value V of each of the first to third pixel signals PS1 to PS3 included in the pixel signal SIG_PX.

$$\mathrm{Var}(I) = \frac{\left(\sum_\Omega I_n^2\right)}{N} - \frac{\left(\sum_\Omega I_n\right)^2}{N^2}$$ ⟨Equation 4⟩

In this regard, $I_n$ means a pixel value of an n-th pixel. N means a total number of pixels. Accordingly, the variance value calculation module 413 may calculate a first pixel signal variance value V_PS1 from the first pixel signal PS1, may calculate a second pixel signal variance value V_PS2 from the second pixel signal PS2, and may calculate a third pixel signal variance value V_PS3 from the third pixel signal PS3.

The variance value calculation module 413 may use a following Equation 5 to calculate the corrected variance value V_C of each of the first to third corrected pixel signals PS1_C to PS3_C included in the corrected pixel signal SIG_PX_C.

$$\mathrm{Var}(I') = \frac{\left(\sum_\Omega I_n'^2\right)}{N} - \frac{\left(\sum_\Omega I_n'\right)^2}{N^2}$$ ⟨Equation 5⟩

In this regard, $I_n'$ means a corrected pixel value of the n-th pixel. Accordingly, the variance value calculation module 413 may calculate a first corrected pixel signal variance value V_PS1_C from the first corrected pixel signal PS1_C, may calculate a second corrected pixel signal variance value V_PS2_C from the second corrected pixel signal PS2_C, and may calculate a third corrected pixel signal variance value V_PS3_C from the third corrected pixel signal PS3_C.

Figure 12:
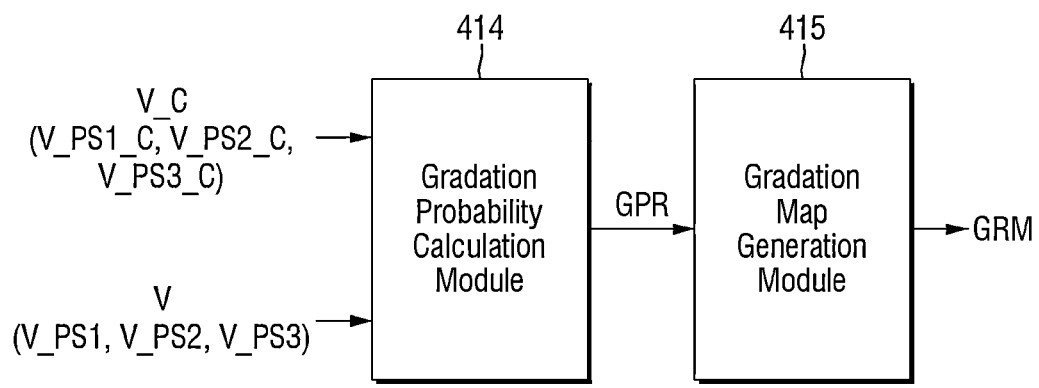
FIG. 12 is a block diagram of a gradation detection module for generating a gradation map according to embodiments.

FIG. 12 is a block diagram of a gradation detection module for generating a gradation map according to embodiments. FIG. 13 is a table of a gradation probability value calculated based on a comparing result of variance values with corrected variance values in FIG. 12.

Referring back to FIG. 9, the gradation detection module 410 may calculate a gradation probability value GPR based on a comparison result between the variance value V and the corrected variance value V_C in S503.

Referring to FIG. 12 and FIG. 13, a gradation probability calculation module 414 included in the gradation detection module 410 may calculate the gradation probability value GPR based on the comparison result between the variance value V and the corrected variance value V_C.

A variance value V of the first pixel signal PS1 corresponds to a first pixel signal variance value V_PS1 and a corrected variance value V_C of the first corrected pixel signal PS1_C corresponds to a first corrected pixel signal variance value V_PS1_C. The first area RG1 of the first pixel signal PS1 corresponds to the flat area. The first pixel signal variance value V_PS1 may correspond to a relatively small value. The first corrected pixel signal variance value V_PS1_C may also correspond to a relatively small value. Further, the first pixel signal variance value V_PS1 and the first corrected pixel signal variance value V_PS1_C may be similar to each other. Accordingly, the gradation probability calculation module 414 may output a first pixel signal gradation probability value GPR_PS1. In this regard, the first pixel signal gradation probability value GPR_PS1 may correspond to a value close to 0 among values between 0 and 1.

That is, the first pixel signal PS1 corresponds to the flat area and does not correspond to the gradation area. Thus, the first pixel signal gradation probability value GRP_PS1 may be close to zero. Further, when both the first pixel signal variance value V_PS1 and the first corrected pixel signal variance value V_PS1_C are relatively small, the gradation detection module 410 may classify the first pixel signal PS1 as the flat area.

The variance value V of the second pixel signal PS2 corresponds to the second pixel signal variance value V_PS2, and the corrected variance value V_C of the second corrected pixel signal PS2_C corresponds to a second corrected pixel signal variance value V_PS2_C. The second area RG2 of the second pixel signal PS2 corresponds to the edge area. The second pixel signal variance value V_PS2 may correspond to a relatively large value, and the second corrected pixel signal variance value V_PS2_C may also correspond to a relatively large value. Further, the second pixel signal variance value V_PS2 and the second corrected pixel signal variance value V_PS2_C may be similar to each other. Accordingly, the gradation probability calculation module 414 may output the second pixel signal gradation probability value GPR_PS2. In this regard, the second pixel signal gradation probability value GPR_PS2 may correspond to a value close to 0 among values between 0 and 1.

That is, the second pixel signal PS2 corresponds to the edge area and does not correspond to the gradation area. Thus, the second pixel signal gradation probability value GRP_PS2 may be close to zero. Further, when both the second pixel signal variance value V_PS2 and the second corrected pixel signal variance value V_PS2_C are relatively large, the gradation detection module 410 may classify the second pixel signal PS2 as the edge area.

The variance value V of the third pixel signal PS3 corresponds to the third pixel signal variance value V_PS3. The corrected variance value V_C of the third corrected pixel signal PS3_C corresponds to the third corrected pixel signal variance value V_PS3_C. The third area RG3 of the third pixel signal PS3 corresponds to the gradation area. The third pixel signal variance value V_PS3 may correspond to a relatively large value. The third corrected pixel signal variance value V_PS3_C may correspond to a relatively small value.

Referring to FIG. 11, the pixel values of the third pixel signal PS3 have a positive slope, but the pixel values of the third corrected pixel signal PS3_C may have a slope close to zero. Accordingly, the third pixel signal variance value V_PS3 may be smaller than the third corrected pixel signal variance value V_PS3_C.

When the third pixel signal variance value V_PS3 is smaller than the third corrected pixel signal variance value V_PS3_C, the gradation probability calculation module 414 may output the third pixel signal gradation probability value GPR_PS3. In this regard, the third pixel signal gradation probability value GPR_PS3 may correspond to a value close to 1 among values between 0 and 1.

That is, because the third pixel signal PS3 corresponds to the gradation area, the third pixel signal gradation probability value GRP_PS3 may be close to 1. Further, when a difference between the third pixel signal variance value V_PS3 and the third corrected pixel signal variance value V_PS3_C is relatively large, the gradation detection module 410 may classify the third pixel signal PS3 as the gradation area.

In embodiments, a difference between the third pixel signal variance value V_PS3 and the third corrected pixel signal variance value V_PS3_C may be greater than a difference between the first pixel signal variance value V_PS1 and the first corrected pixel signal variance value V_PS1_C. Further, the difference between the third pixel signal variance value V_PS3 and the third corrected pixel signal variance value V_PS3_C may be greater than a difference between the second pixel signal variance value V_PS2 and the second corrected pixel signal variance value V_PS2_C.

In summary, the gradation probability calculation module 414 may determine and output the gradation probability value GPR based on the comparison result between the variance value V and the corrected variance value V_C. The gradation detection module 410 may perform the above process on the pixel signal SIG_PX to classify the first to third pixel signals PS1 to PS3 as the flat area, the edge area, and the gradation area and indicate whether each of the first to third pixel signals PS1 to PS3 correspond to the gradation area using the gradation probability value GPR. The image signal processor 400 performs the correction on the pixel signal SIG_PX using the generated gradation probability value GPR to improve image quality.

Figure 14:
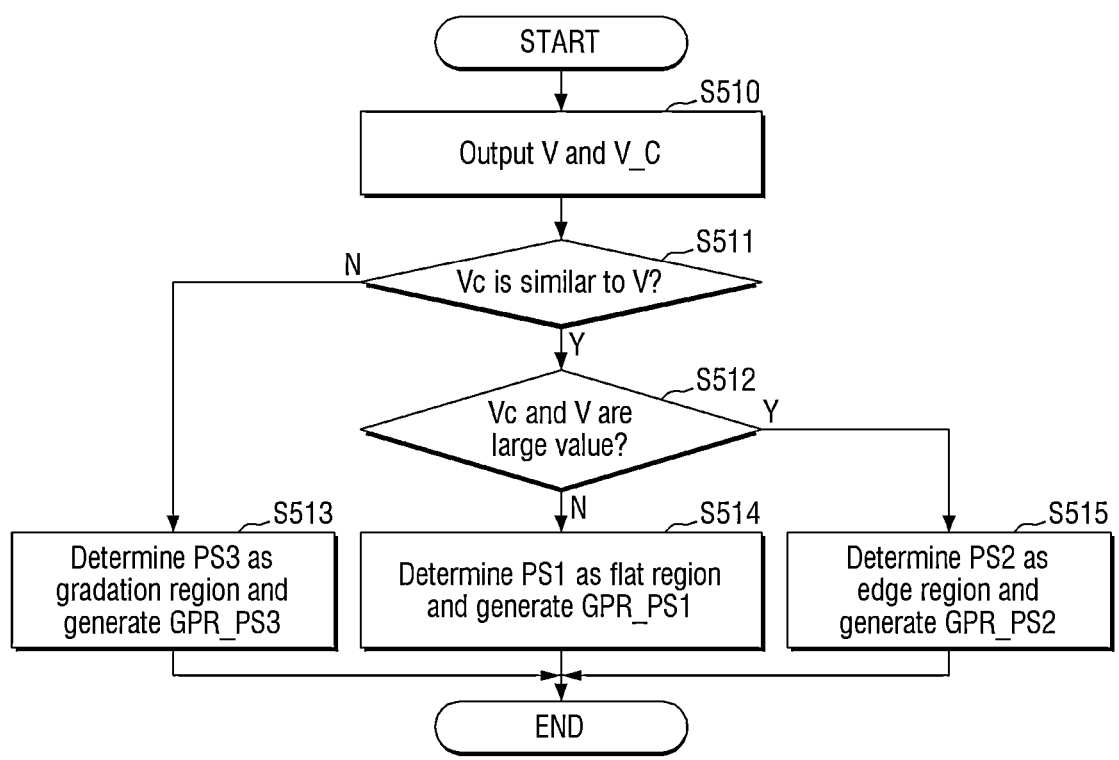
FIG. 14 is a flowchart for illustrating a method for determining each of pixel signals as one of a flat area, an edge area, and a gradation area based on a comparison result between a variance value and a corrected variance value in FIG. 12.

FIG. 14 is a flowchart for illustrating a method for determining each of pixel signals as one of a flat area, an edge area, and a gradation area based on a comparison result between a variance value and a corrected variance value in FIG. 12.

Referring to FIG. 10 and FIG. 14, the variance value calculation module 413 may output the variance value V and the corrected variance value V_C in S510. Subsequently, the gradation detection module 410 may determine each of the first to third pixel signals PS1 to PS3 as one of a flat area, an edge area, and a gradation area based on the variance value V and the corrected variance value V_C.

When the corrected variance value V_C is not similar to the variance value V (S511—N), the gradation detection module 410 determines the third pixel signal PS3 as the gradation area and generates the third pixel signal gradation probability value GPR_PS3 in S513. That is, when the variance value V is greater than the corrected variance value V_C, the gradation detection module 410 may determine the third pixel signal PS3 as the gradation area.

When the corrected variance value V_C is similar to the variance value V (S511—Y), the gradation detection module 410 may determine whether each of the corrected variance value V_C and the variance value V is a large value in S512. When each of the corrected variance value V_C and the variance value V is not relatively large (S512—N), the gradation detection module 410 may determine the first pixel signal PS1 as the flat area and may generate the first pixel signal gradation probability value GPR_PS1 in S514. When each of the corrected variance value V_C and the variance value V is a relatively large value (S512—Y), the gradation detection module 410 may determine the second pixel signal PS2 as the edge area and may generate the second pixel signal gradation probability value GPR_PS2 in S515.

Figure 15:
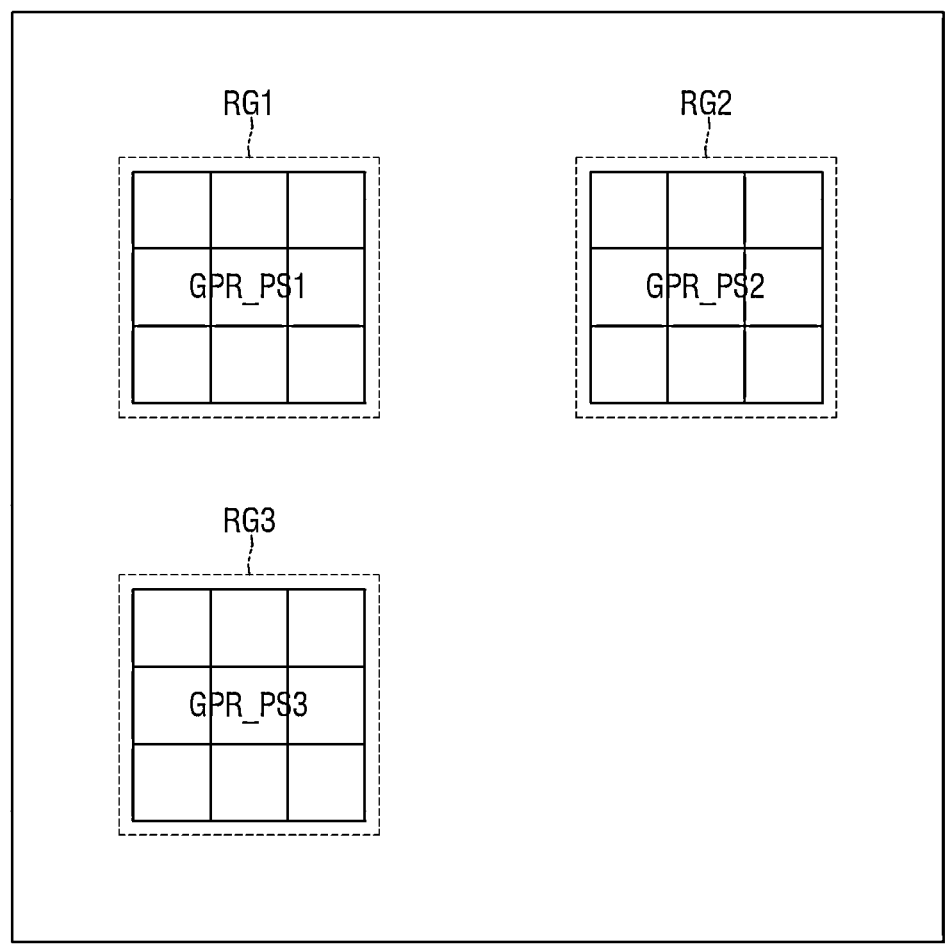
FIG. 15 is a diagram of a gradation map according to embodiments.

FIG. 15 is a diagram of a gradation map according to embodiments.

Referring to FIG. 9, FIG. 12 and FIG. 15, the gradation map generation module 415 included in the gradation detection module 410 may generate the gradation map GRM based on the gradation probability value GPR in S504. The gradation map GRM may include the first pixel signal gradation probability value GPR_PS1 corresponding to the first area RG1 and the first pixel signal PS1, the second pixel signal gradation probability value GPR_PS2 corresponding to the second area RG2 and the second pixel signal PS2, and the third pixel signal gradation probability value GPR_PS3 corresponding to the third area RG3 and the third pixel signal PS3. That is, the gradation map GRM may include information about the probability that a corresponding area or pixel signal corresponds to the gradation area. As a result, the gradation map GRM may be output from the gradation detection module 410.

Figure 16:
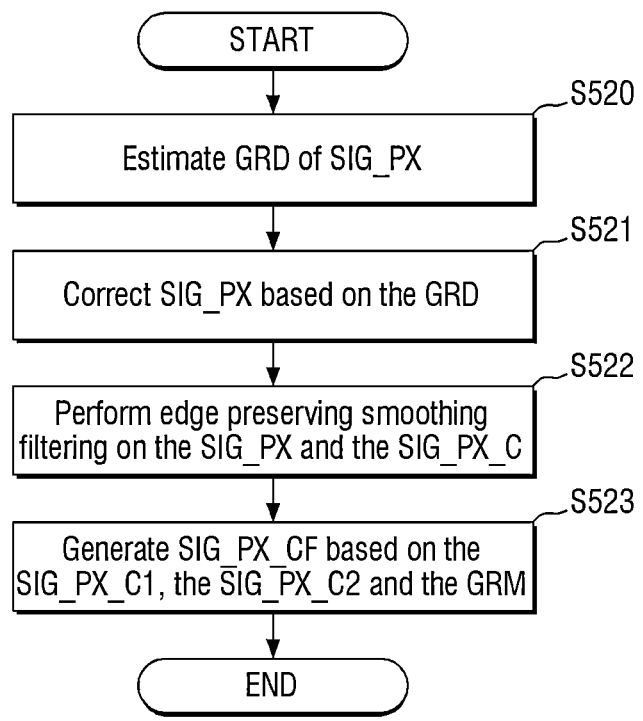
FIG. 16 is a flowchart of a method for generating a final corrected pixel signal according to embodiments.
Figure 17:
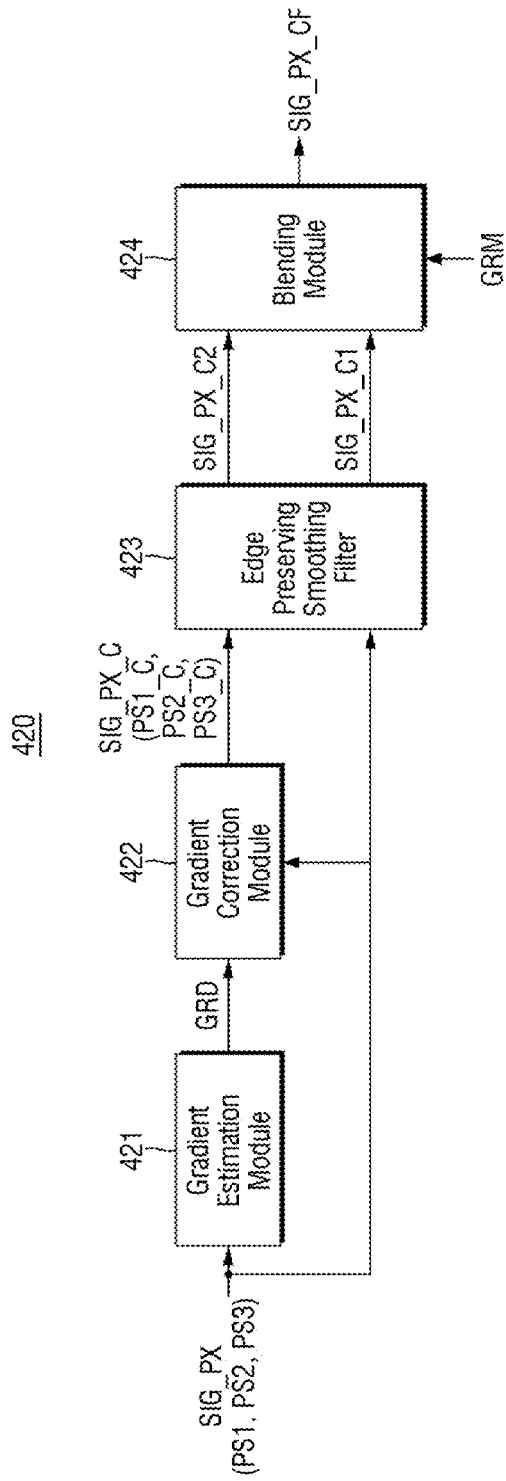
FIG. 17 is a block diagram of a correction module according to embodiments.
Figure 18:
FIG. 18 shows views for comparing the pixel signal with the final corrected pixel signal.

FIG. 16 is a flowchart of a method for generating a final corrected pixel signal according to embodiments. FIG. 17 is a block diagram of a correction module according to embodiments. FIG. 18 shows views for comparing the pixel signal with the final corrected pixel signal.

Referring to FIG. 16 through FIG. 18, the correction module 420 may estimate the gradient GRD of the pixel signal SIG_PX in S520. For example, a gradient estimation module 421 included in the correction module 420 may estimate the gradient GRD of each of the first to third pixel signals PS1 to PS3. Subsequently, a gradient correction module 422 may correct the pixel signal SIG_PX based on the gradient GRD in S521. Accordingly, the corrected pixel signal SIG_PX_C may be output from the gradient correction module 422. In this regard, the gradient estimation module 421 and the gradient correction module 422 may respectively perform the same functions as those of the gradient estimation module 411 and the gradient correction module 412.

An edge preserving smoothing filter 423 may perform edge preserving smoothing filtering on the received pixel signal SIG_PX and the received corrected pixel signal SIG_PX_C in S522. In this regard, the edge preserving smoothing filtering refers to an operation of preserving the pixel signal in the edge area and removing noise from the pixel signal in an area other than the edge area. For example, the edge preserving smoothing filtering may include a non-local mean algorithm. The edge preserving smoothing filter 423 may perform the edge preserving smoothing filtering on the pixel signal SIG_PX using a following Equation 6.

$$Out = \frac{\sum_\Omega w_n I_n}{\sum_\Omega w_n} \qquad \text{⟨Equation 6⟩}$$

In this regard, $I_n$ means a pixel value of an n-th pixel of the pixel signal SIG_PX. Wn refers to a non-local mean weight of $I_n$. Thus, the edge preserving smoothing filter 423 may perform the correction on the pixel signal SIG_PX to generate the first corrected pixel signal SIG_PX_C1.

The edge preserving smoothing filter 423 may perform the edge preserving smoothing filtering on the corrected pixel signal SIG_PX_C using a following Equation 7.

$$Out' = \frac{\sum_\Omega w'_n I'_n}{\sum_\Omega w'_n} = \frac{\sum_\Omega w'_n (I_n - (a_x(n_x - c_x) + a_y(n_y - c_y)))}{\sum_\Omega w'_n} \qquad \text{⟨Equation 7⟩}$$

In this regard, $I_n'$ means a pixel value of the n-th pixel of the corrected pixel signal SIG_PX_C. Wn refers to a non-local mean weight of $I_n'$. Thus, the edge preserving smoothing filter 423 may perform the correction on the corrected pixel signal SIG_PX_C to generate the second corrected pixel signal SIG_PX_C2.

Subsequently, a blending module 424 included in the correction module 420 may generate a final corrected pixel signal SIG_PX_CF based on the first corrected pixel signal SIG_PX_C1, the second corrected pixel signal SIG_PX_C2 and the gradation map GRM in S523. That is, the blending module 424 may correct the second corrected pixel signal SIG_PX_C2 based on the gradation probability value GPR corresponding to the gradation map GRM. Further, the blending module 424 may correct the first corrected pixel signal SIG_PX_C1 based on the gradation probability value GPR corresponding to the gradation map GRM. Further, the blending module 424 may blend the first and second corrected pixel signals SIG_PX_C1 and SIG_PX_C2 as corrected based on the gradation map GRM with each other to generate the final corrected pixel signal SIG_PX_CF. This process may be expressed as a following Equation 8.

$$Out_{Final} = Out \cdot (1-GPR) + Out' \cdot GPR \qquad \text{⟨Equation 8⟩}$$

In this regard, Out corresponds to a pixel value of the first corrected pixel signal SIG_PX_C1, Out' corresponds to a pixel value of the second corrected pixel signal SIG_PX_C, and GPR means a gradation probability value GPR corresponding to each pixel. That is, when a corresponding pixel corresponds to the gradation area, the final corrected pixel signal SIG_PX_CF may correspond to the second corrected pixel signal SIG_PX_C2. Further, when the corresponding pixel does not correspond to the gradation area, the final corrected pixel signal SIG_PX_CF may correspond to the first corrected pixel signal SIG_PX_C1. Accordingly, the pixel value corresponding to the gradation area may be corrected so that image quality may be improved.

Hereinafter, a correction module 420' according to further embodiments will be described with reference to FIG. 19.

Figure 19:
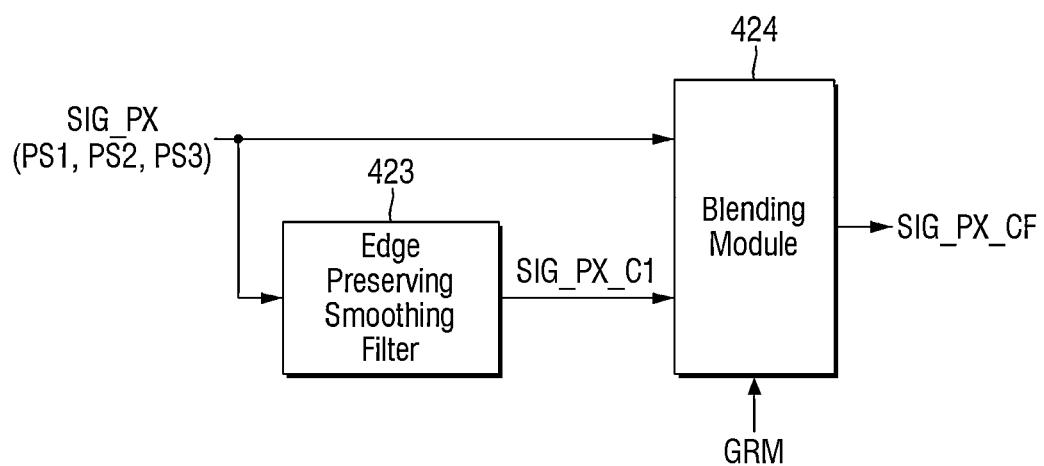
FIG. 19 is a block diagram of a correction module according to embodiments.

FIG. 19 is a block diagram of a correction module according to embodiments.

For convenience of description, components or configurations duplicate with those described using FIG. 1 to FIG. 18 are briefly described or omitted.

Referring to FIG. 19, the correction module 420' may include the edge preserving smoothing filter 423 and the blending module 424.

That is, unlike the correction module 420 as described with reference to FIG. 17, the correction module 420' may not include the gradient estimation module 421 and the gradient correction module 422. The blending module 424 may receive the pixel signal SIG_PX and the first corrected pixel signal SIG_PX_C1. The blending module 424 may perform correction on the pixel signal SIG_PX and the first corrected pixel signal SIG_PX_C1 based on the gradation map GRM. In this case, the blending module 424 may generate the final corrected pixel signal SIG_PX_CF by multiplying the pixel signal SIG_PX instead of the second corrected pixel signal SIG_PX_C2 by the gradation probability value GPR of the gradation map GRM.

Hereinafter, an image signal processor 400' according to further embodiments will be described with reference to FIG. 20 and FIG. 21.

Figure 20:
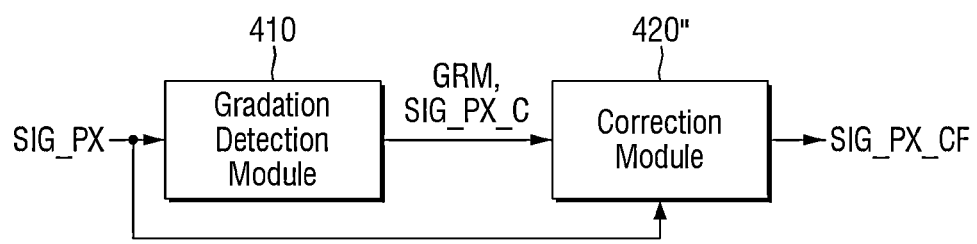
FIG. 20 is a block diagram of an image signal processor according to embodiments.

FIG. 20 is a block diagram of an image signal processor according to embodiments. FIG. 21 is a block diagram of a correction module of FIG. 20. For convenience of descriptions, components or configurations duplicate with those as described using FIG. 1 to FIG. 18 are briefly described or omitted.

Figure 21:
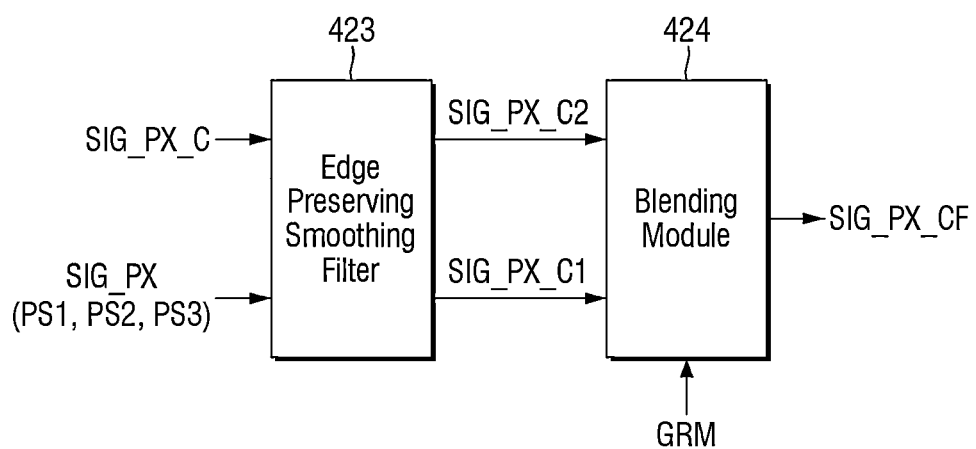
FIG. 21 is a block diagram of a correction module of FIG. 20.

Referring to FIG. 20 and FIG. 21, the image signal processor 400' may include the gradation detection module 410 and a correction module 420". In this regard, the correction module 420" may receive the corrected pixel signal SIG_PX_C and the gradation map GRM from the gradation detection module 410. The edge preserving smoothing filter 423 included in correction module 420" may perform correction on the corrected pixel signal SIG_PX_C to generate and output the second corrected pixel signal SIG_PX_C2. In this embodiment, the corrected pixel signal SIG_PX_C generated from the gradient correction module 412 may be transmitted to the correction module 420", such that it is not necessary to re-generate the corrected pixel signal SIG_PX_C. Thus, power consumption may be reduced.

Hereinafter, electronic devices 600 and 600' according to further embodiments will be respectively described with reference to FIG. 22 and FIG. 23.

Figure 22:
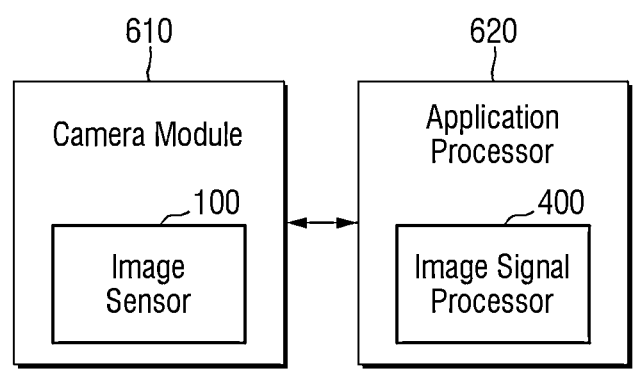
FIG. 22 is a diagram of an electronic device according to embodiments.

FIG. 22 is a diagram of an electronic device according to embodiments. FIG. 23 is a diagram of an electronic device according to embodiments. For convenience of descriptions, components or configurations duplicate with those as described using FIG. 1 to FIG. 21 are briefly described or omitted.

Referring to FIG. 22, the electronic device 600 may include a camera module 610 and an application processor 620. The application processor 620 may process and display an image signal output from the camera module 610 and may control the camera module 610.

The camera module 610 may include the image sensor 100. The application processor 620 may include the image signal processor 400. The image sensor 100 may be located in the camera module 610. The image sensor 100 may generate the pixel signal SIG_PX and provide the same to the application processor 620.

Figure 23:
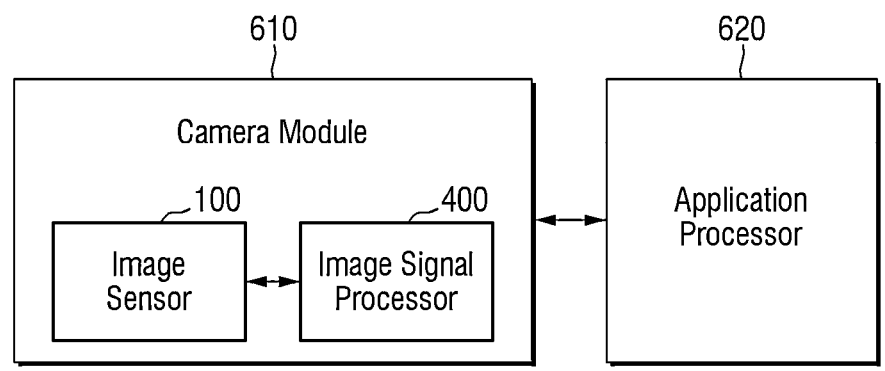
FIG. 23 is a diagram of an electronic device according to embodiments.

Referring to FIG. 23, the electronic device 600' may include the camera module 610 and the application processor 620. The camera module 610 may include both the image sensor 100 and the image signal processor 400. That is, both the image sensor 100 and the image signal processor 400 may be located in the camera module 610.

Hereinafter, an image sensor 100" according to further embodiments will be described with reference to FIG. 24.

Figure 24:
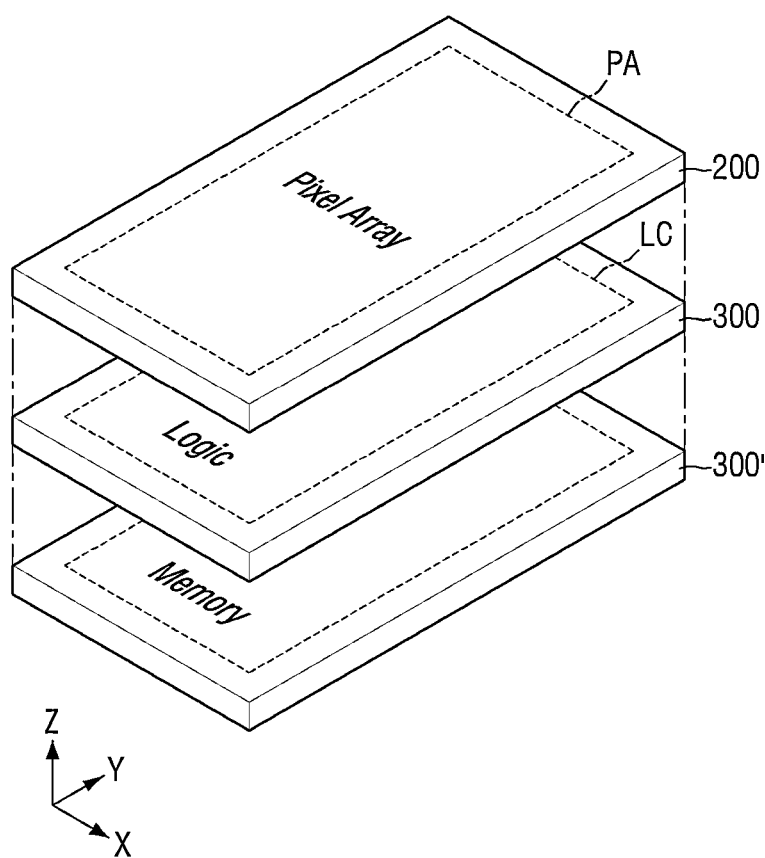
FIG. 24 is a diagram for illustrating a conceptual layout of an image sensor according to embodiments.

FIG. 24 is a diagram for illustrating a conceptual layout of an image sensor according to embodiments. For convenience of description, components or configurations duplicate with those as described using FIG. 1 to FIG. 21 are briefly described or omitted.

Referring to FIG. 24, the image sensor 100" may include the upper chip 200, the lower chip 300, and a memory chip 300'. In this regard, the upper chip 200, the lower chip 300, and the memory chip 300' may be sequentially stacked along a third direction Z. The memory chip 300' may be disposed under the lower chip 300. The memory chip 300' may include a memory device. For example, the memory chip 300' may include a volatile memory device such as DRAM and SRAM. The memory chip 300' may receive a signal from the upper chip 200 and the lower chip 300 and process the signal via the memory device. That is, the image sensor 100" including the memory chip 300' may be embodied as a 3-stack image sensor.

Hereinafter, an electronic device 2000 according to further embodiments will be described with reference to FIG. 25 and FIG. 26.

Figure 25:
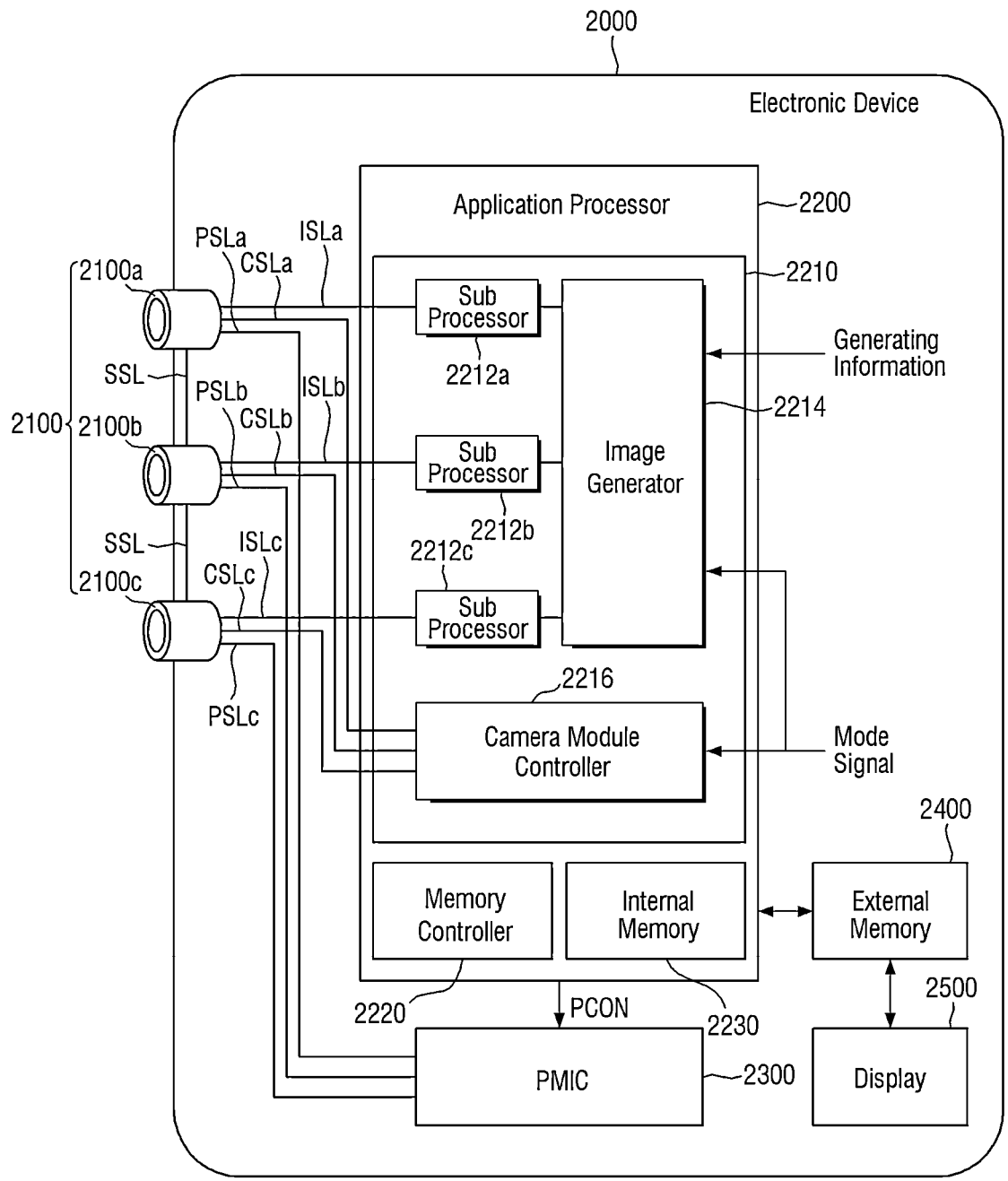
FIG. 25 is a block diagram for illustrating an electronic device including multi-camera modules according to embodiments.

FIG. 25 is a block diagram for illustrating an electronic device including multi-camera modules according to embodiments. FIG. 26 is a detailed block diagram of the camera module of FIG. 25. For convenience of description, components or configurations duplicate with those as described using FIG. 1 to FIG. 24 are briefly described or omitted.

Referring to FIG. 25, the electronic device 2000 may include a camera module group 2100, an application processor 2200, a PMIC 2300, an external memory 2400, and a display 2500.

The camera module group 2100 may include a plurality of camera modules 2100a, 2100b, and 2100c. Although the drawing shows an implementation in which the three camera modules 2100a, 2100b, and 2100c are arranged, implementations of the present disclosure are not limited thereto. In implementations, the camera module group 2100 may be modified to include only two camera modules. Further, in implementations, the camera module group 2100 may be modified to include n camera modules (n being a natural number equal to or greater than 4).

Hereinafter, with reference to FIG. 26, a detailed configuration of the camera module 2100b will be described more specifically. A following description may be equally applied to other camera modules 2100a and 2100c depending on an implementation.

Figure 26:
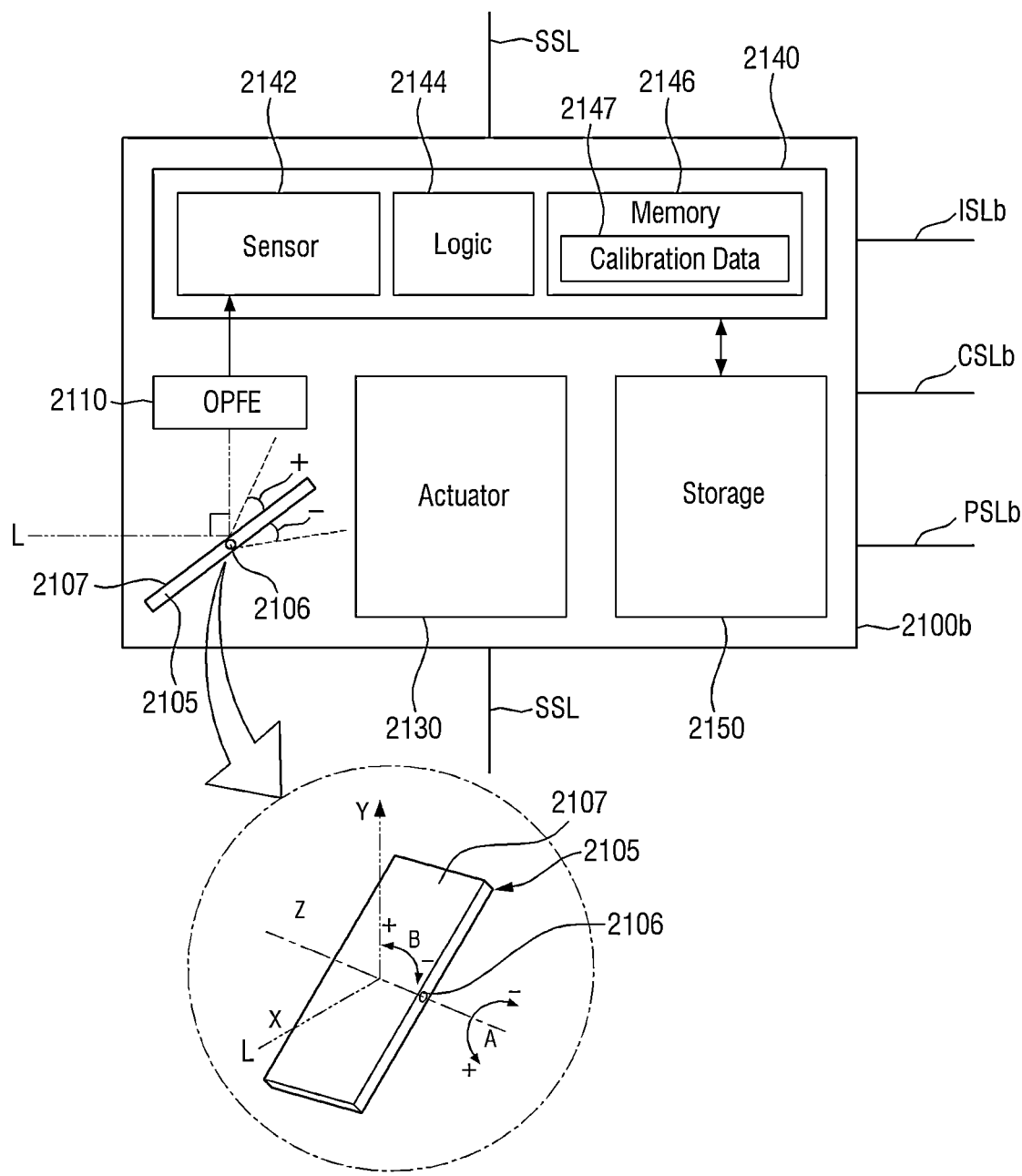
FIG. 26 is a detailed block diagram of the camera module of FIG. 25.

Referring to FIG. 26, the camera module 2100b may include a prism 2105, an optical path folding element (hereinafter, "OPFE") 2110, an actuator 2130, an image sensing device 2140, and storage 2150.

The prism 2105 may include a reflective face 2107 made of a light reflective material and, thus, may change a path of light L incident from outside.

In implementations, the prism 2105 may change the path of light L incident in the first direction X into the second direction Y perpendicular to the first direction X. Further, the prism 2105 may rotate the reflective face 2107 made of the light reflective material around a center axis 2106 in an A direction or may rotate the center axis 2106 in a B direction so that the path of the light L incident in the first direction X may be changed to the second direction Y perpendicular thereto. In this regard, the OPFE 2110 may move in a third direction Z perpendicular to a plane including the first direction X and the second direction Y.

In implementations, as shown, a maximum rotation angle in the A direction of the prism 2105 may be smaller than or equal to 15 degrees in a plus (+) A direction and may be greater than 15 degrees in a minus (−) A direction. However, implementations of the present disclosure are not limited thereto.

In implementations, the prism 2105 may move by a range around 20 degrees, or between 10 and 20 degrees, or between 15 and 20 degrees in the plus (+) or minus (−) B direction. In this regard, the prism 2105 may move by the same angle in the plus (+) and minus (−) B directions. Alternatively, angles by which the prism 2105 may move in the plus (+) and minus (−) B directions, respectively, may have a difference of about 1 degree therebetween.

In implementations, the prism 2105 may move the reflective face 2107 made of the light reflective material in the third direction, for example, the Z direction parallel to an extension direction of the center axis 2106.

The OPFE 2110 may include a group of m optical lenses (m being a natural number). The group of m optical lenses may move in the second direction Y to change an optical zoom ratio of the camera module 2100b. For example, a basic optical zoom ratio of the camera module 2100b may be Z. When the m optical lenses included in the OPFE 2110 move, the optical zoom ratio of the camera module 2100b may be changed to an optical zoom ratio equal to or higher than 3Z or 5Z.

The actuator 2130 may move the OPFE 2110 or the optical lens to a specific position. For example, the actuator 2130 may adjust a position of the optical lens so that the image sensor 2142 is located at a focal length of the optical lens for accurate sensing.

The image sensing device 2140 may include an image sensor 2142, a control logic 2144 and a memory 2146. The image sensor 2142 may sense an image of a sensing target using the light L provided through the optical lens. In embodiments, the image sensor 2142 may output the pixel signal SIG_PX as described above.

The control logic 2144 may control all of operations of the camera module 2100b. For example, the control logic 2144 may control an operation of the camera module 2100b based on a control signal provided through a control signal line CSLb.

The memory 2146 may store therein information necessary for the operation of the camera module 2100b, such as calibration data 2147. The calibration data 2147 may include information required when the camera module 2100b generates image data using the light L provided from the outside. The calibration data 2147 may include, for example, information about a degree of rotation, information about a focal length, information about an optical axis and the like, as described above. When the camera module 2100b is implemented in a multi-state camera form in which the focal length varies based on a position of the optical lens, the calibration data 2147 may include a focal length value based on each position (or each state) of the optical lens and information related to auto focusing.

The storage 2150 may store therein image data sensed via the image sensor 2142. The storage 2150 may be disposed outside the image sensing device 2140 and may be implemented to be stacked on a sensor chip constituting the image sensing device 2140. In implementations, the storage 2150 may be embodied as an EEPROM (Electrically Erasable Programmable Read-Only Memory). However, implementations of the present disclosure are not limited thereto.

Referring to FIG. 25 and FIG. 26 together, in implementations, each of the plurality of camera modules 2100a, 2100b, and 2100c may include each actuator 2130. Accordingly, each of the plurality of camera modules 2100a, 2100b, and 2100c may include the same or different calibration data 2147 based on an operation of the actuator 2130 included therein.

In implementations, one camera module (e.g., 2100b) among the plurality of camera modules 2100a, 2100b, and 2100c may be a camera module in a folded lens form including the prism 2105 and the OPFE 2110 as described above, while each of the remaining camera modules (e.g., 2100a and 2100c) may be a vertical type camera module that does not include the prism 2105 and the OPFE 2110. However, implementations are not limited thereto.

In implementation, one camera module (e.g., 2100c) among the plurality of camera modules 2100a, 2100b, and 2100c, may be a depth camera of a vertical form that extracts depth information, for example, using IR (Infrared Ray). In this case, the application processor 2200 may merge image data provided from the depth camera and image data provided from another camera module (e.g., 2100a or 2100b) to generate a three-dimensional depth image (3D depth image).

In implementations, at least two (e.g., 2100a and 2100b) of the plurality of camera modules 2100a, 2100b, and 2100c may have different FOVs (Field of Views). In this case, for example, at least two of the plurality of camera modules 2100a, 2100b, and 2100c, for example, optical lenses of at least two (e.g., 2100a and 2100b) of the plurality of camera modules 2100a, 2100b, and 2100c may be different from each other. However, the present disclosure is not limited thereto.

Further, in implementation, FOVs of the plurality of camera modules 2100a, 2100b, and 2100c may be different from each other. In this case, the optical lenses respectively included in the plurality of camera modules 2100a, 2100b, and 2100c may also be different from each other. However, the present disclosure is not limited thereto.

In implementations, the plurality of camera modules 2100a, 2100b, and 2100c may be physically separated from each other. That is, instead of a scheme in which a sensing area of one image sensor 2142 is divided into a plurality of sub-areas which correspond to the plurality of camera modules 2100a, 2100b, and 2100c, a scheme in which an individual image sensor 2142 may be disposed in each of the plurality of camera modules 2100a, 2100b, and 2100c may be employed.

Referring back to FIG. 25, the application processor 2200 may include an image processing device 2210, a memory controller 2220, and an internal memory 2230. The application processor 2200 may be implemented to be separated from the plurality of camera modules 2100a, 2100b, and 2100c. For example, the application processor 2200 and the plurality of camera modules 2100a, 2100b, and 2100c may be implemented as separate semiconductor chips separated from each other.

The image processing device 2210 may include a plurality of sub-image processors 2212a, 2212b and 2212c, an image generator 2214, and a camera module controller 2216.

The number of the sub-image processors 2212a, 2212b, and 2212c may correspond to the number of camera modules 2100a, 2100b, and 2100c.

Image data generated from each of the camera modules 2100a, 2100b, and 2100c may be provided to each of the sub-image processors 2212a, 2212b, and 2212c via each of image signal lines ISLa, ISLb, and ISLc separated from each other. For example, the image data generated from the camera module 2100a may be transmitted to the sub-image processor 2212a via the image signal line ISLa. The image data generated from the camera module 2100b may be transmitted to the sub-image processor 2212b via the image signal line ISLb. The image data generated from the camera module 2100c may be transmitted to the sub-image processor 2212c via the image signal line ISLc. The image data transmission may be performed, for example, using a camera serial interface (CSI) based on a MIPI (Mobile Industry Processor Interface). However, implementations of the present disclosure are not limited thereto.

In one example, in implementations, one sub-image processor may correspond to a plurality of camera modules. For example, the sub-image processor 2212a and the sub-image processor 2212c may not be implemented separately from each other as shown but may be integrated into one sub-image processor. The image data provided from the camera module 2100a and the camera module 2100c may be selected via a selection element, for example, a multiplexer and then may be provided to the integrated sub-image processor.

The image data provided to each of the sub-image processors 2212a, 2212b, and 2212c may be provided to the image generator 2214. The image generator 2214 may generate an output image using the image data provided from each of the sub-image processors 2212a, 2212b, and 2212c and based on image generation information or a mode signal.

Specifically, the image generator 2214 may merge at least a portion of the image data generated from the camera modules 2100a, 2100b, and 2100c having different FOVs and based on the image generation information or the mode signal and thus may generate the output image as the merging result. Further, the image generator 2214 may select one of the image data generated from the camera modules 2100a, 2100b, and 2100c having different FOVs and based on the image generation information or the mode signal and thus may generate the output image as the selected data.

In implementations, the image generation information may include a zoom signal or a zoom factor. Further, in implementations, the mode signal may be, for example, a signal based on a mode selected by a user.

When the image generation information is the zoom signal or the zoom factor and the camera modules 2100a, 2100b, and 2100c have different FOVs, the image generator 2214 may perform different operations based on types of the zoom signal. For example, when the zoom signal is a first signal, the image generator may merge the image data output from the camera module 2100a and the image data output from the camera module 2100c with each other and generate the output image using the merged image data, and the image data output from the camera module 2100b which is not used in the merging operation. When the zoom signal is a second signal different from the first signal, the image generator 2214 may not perform such an image data merging operation but may select one of the image data output from the camera modules 2100a, 2100b, and 2100c and may generate the selected data as the output image. However, implementations are not limited thereto. A scheme for processing the image data may be modified as needed.

In implementations, the image generator 2214 may receive a plurality of image data having different exposure times from at least one of the plurality of sub-image processors 2212a, 2212b, and 2212c and may perform HDR (high dynamic range) processing on the received plurality of image data, thereby generating merged image data having an increased dynamic range.

The camera module controller 2216 may provide a control signal to each of the camera modules 2100a, 2100b, and 2100c. The control signal generated from the camera module controller 2216 may be provided to a corresponding one of the camera modules 2100a, 2100b, and 2100c via a corresponding one of the control signal lines CSLa, CSLb, and CSLc separated from each other.

One of the plurality of camera modules 2100a, 2100b, and 2100c may be designated as a master camera (e.g., 2100b) based on the image generation information including the zoom signal or the mode signal, while each of the remaining camera modules (e.g., 2100a and 2100c) may be designated as a slave camera. This designation information may be included in the control signal and may be provided to a corresponding one of the camera modules 2100a, 2100b, and 2100c via a corresponding one of the control signal lines CSLa, CSLb, and CSLc separated from each other.

The camera module acting as the master or slave camera may vary based on the zoom factor or an operation mode signal. For example, when the FOV of the camera module 2100a is larger than that of the camera module 2100b and the zoom factor indicates a low zoom ratio, the camera module 2100b may act as a master camera while the camera module 2100a may act as a slave camera. Conversely, when the zoom factor indicates a high zoom ratio, the camera module 2100a may act as a master camera while the camera module 2100b may act as a slave camera.

In implementations, the control signal from the camera module controller 2216 provided to each of the camera modules 2100a, 2100b, and 2100c may include a sync enable signal. For example, when the camera module 2100b is the master camera and each of the camera modules 2100a and 2100c is the slave camera, the camera module controller 2216 may transmit the sync enable signal to the camera module 2100b. Upon receiving such a sync enable signal, the camera module 2100b may generate a sync signal based on the provided sync enable signal and may provide the generated sync signal to the camera modules 2100a and 2100c via a sync signal line SSL. The camera module 2100b and the camera modules 2100a and 2100c may transmit the image data to the application processor 2200 while the camera module 2100b and the camera modules 2100a and 2100c are synchronized with each other using the sync signal.

In implementations, the control signal from the camera module controller 2216 provided to each of the plurality of camera modules 2100a, 2100b, and 2100c may include mode information according to the mode signal. Based on this mode information, the plurality of camera modules 2100a, 2100b, and 2100c may operate in a first operation mode or a second operation mode in relation to a sensing speed.

In the first operation mode, the plurality of camera modules 2100a, 2100b, and 2100c may generate an image signal at a first speed (for example, may generate an image signal at a first frame rate), may encode the image signal at a second speed higher than the first speed (for example, encode the image signal at a second frame rate higher than the first frame rate), and may transmit the encoded image signal to the application processor 2200. In this regard, the second speed may be lower than or equal to 30 times of the first speed.

The application processor 2200 may store the received image signal, that is, the encoded image signal in the memory 2230 provided therein or a storage 1400 external to the application processor 2200, then read and decode the encoded image signal from the memory 2230 or the storage 1400, and then display image data generated based on the decoded image signal. For example, a corresponding auxiliary processor among the plurality of auxiliary processors 2212a, 2212b, and 2212c of the image processing device 2210 may perform the decoding and may perform the image processing on the decoded image signal.

In the second operation mode, the plurality of camera modules 2100a, 2100b, and 2100c may generate an image signal at a third speed lower than the first speed (for example, generate an image signal at a third frame rate lower than the first frame rate) and then transmit the image signal to the application processor 2200. The image signal provided to the application processor 2200 may be an unencoded signal. The application processor 2200 may perform image processing on the received image signal or may store the image signal in the memory 2230 or the storage 1400.

The PMIC 2300 may supply power, for example, a power supply voltage to each of the plurality of camera modules 2100a, 2100b, and 2100c. For example, the PMIC 2300 may supply first power to the camera module 2100a through a first power signal line PSLa, supply second power to the camera module 2100b through a second power signal line PSLb, and supply third power to the camera module 2100c through a third power signal line PSLc under control of the application processor 2200.

The PMIC 2300 may generate power corresponding to each of the plurality of camera modules 2100a, 2100b, and 2100c and adjust a power level in response to a power control signal PCON from the application processor 2200. The power control signal PCON may include an operation mode-based power adjustment signal for the plurality of camera modules 2100a, 2100b, and 2100c. For example, the operation mode may include a low power mode and a high power mode. In this regard, the power control signal PCON may include information about a camera module operating in the low power mode and a set power level. Levels of powers provided to the plurality of camera modules 2100a, 2100b, and 2100c may be the same as or different from each other. Further, the level of the power may vary dynamically.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure but to describe the present disclosure. The scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. An image signal processor comprising:
   a gradation detection module configured to receive a pixel signal from an external device; and
   a correction module connected to the gradation detection module and configured to receive the pixel signal, wherein:
   the gradation detection module is configured to:
      estimate a gradient of the pixel signal;
      correct the pixel signal based on the gradient to generate a corrected pixel signal;
      calculate a first variance value based on the pixel signal;
      calculate a second variance value based on the corrected pixel signal;
      calculate a gradation probability value based on a comparison result between the first variance value and the second variance value; and
      generate a gradation map as information about the gradation probability value of the pixel signal, and
   the correction module is configured to correct the pixel signal based on the gradation map.

2. The image signal processor of claim 1, wherein the gradation probability value is greater when the first variance value is greater than the second variance value than when the second variance value is greater than the first variance value.

3. The image signal processor of claim 2, wherein the gradation probability value is greater when the first variance value is greater than the second variance value than when the first variance value is equal to the second variance value.

4. The image signal processor of claim 1, wherein the correction module is configured to generate a final corrected pixel signal based on the pixel signal and the gradation probability value.

5. The image signal processor of claim 1, wherein the correction module includes:
   a correction filter configured to correct the pixel signal to generate a first corrected pixel signal; and
   a blending module configured to perform correction based on the pixel signal, the first corrected pixel signal, and the gradation map to generate a final corrected pixel signal.

6. The image signal processor of claim 5, wherein the final corrected pixel signal corresponds to a difference value between: (1) a product of the pixel signal and the gradation probability value included in the gradation map and (2) a product of the first corrected pixel signal and the gradation probability value.

7. The image signal processor of claim 1, wherein the correction module includes:
   a correction filter configured to correct the pixel signal to generate a first corrected pixel signal and to correct the corrected pixel signal from the gradation detection module to generate a second corrected pixel signal; and
   a blending module configured to perform correction based on the first corrected pixel signal, the second corrected pixel signal, and the gradation map to generate a final corrected pixel signal.

8. The image signal processor of claim 1, wherein:
   the pixel signal includes a first pixel value and a plurality of second pixel values, and
   the estimating of the gradient of the pixel signal includes deriving a sum of gradients of the second pixel values with respect to the first pixel value.

9. The image signal processor of claim 1, wherein the correction module includes:
   a pixel correction module configured to estimate the gradient of the pixel signal and to correct the pixel signal based on the gradient to generate a first corrected pixel signal;
   a correction filter configured to correct the pixel signal to generate a second corrected pixel signal and to correct the first corrected pixel signal to generate a third corrected pixel signal; and
   a blending module configured to perform correction based on the second corrected pixel signal, the third corrected pixel signal, and the gradation map to generate a final corrected pixel signal.

10. An image sensing device comprising:
    an image sensor including different first to third areas; and
    an image signal processor configured to receive a first pixel signal generated from the first area, a second pixel signal generated from the second area, and a third pixel signal generated from the third area, wherein:
    the image signal processor is configured to:
       perform correction on the first pixel signal to generate a first corrected pixel signal, perform correction on the second pixel signal to generate a second corrected pixel signal, and perform correction on the third pixel signal to generate a third corrected pixel signal;

calculate a first pixel signal variance value based on the first pixel signal, calculate a second pixel signal variance value based on the second pixel signal, and calculate a third pixel signal variance value based on the third pixel signal;

calculate a first corrected pixel signal variance value based on the first corrected pixel signal, calculate a second corrected pixel signal variance value based on the second corrected pixel signal, and calculate a third corrected pixel signal variance value based on the third corrected pixel signal; and calculate a first gradation probability value based on a comparison result between the third pixel signal variance value and the third corrected pixel signal variance value, and the third pixel signal variance value is greater than the third corrected pixel signal variance value.

11. The image sensing device of claim 10, wherein the image signal processor is configured to:

calculate a second gradation probability value based on a comparison result between the first pixel signal variance value and the first corrected pixel signal variance value; and calculate a third gradation probability value based on a comparison result between the second pixel signal variance value and the second corrected pixel signal variance value.

12. The image sensing device of claim 11, wherein a difference between the third pixel signal variance value and the third corrected pixel signal variance value is greater than each of: (1) a difference between the first pixel signal variance value and the first corrected pixel signal variance value and (2) a difference between the second pixel signal variance value and the second corrected pixel signal variance value.

13. The image sensing device of claim 12, wherein the first gradation probability value is greater than each of the second and third gradation probability values.

14. The image sensing device of claim 11, wherein the image signal processor is configured to:

correct the third pixel signal based on the first gradation probability value;

correct the first pixel signal based on the second gradation probability value; and correct the second pixel signal based on the third gradation probability value.

15. The image sensing device of claim 11, wherein the image signal processor is configured to:

generate a gradation map including the second gradation probability value of the first area, the third gradation probability value of the second area, and the first gradation probability value of the third area; and correct the first to third pixel signals based on the gradation map.

16. The image sensing device of claim 10, wherein the image signal processor is configured to correct the third pixel signal based on the first gradation probability value.

17. The image sensing device of claim 10, wherein:

the generating of the first corrected pixel signal includes estimating a first gradient of the first pixel signal and correcting the first pixel signal based on the first gradient, the generating of the second corrected pixel signal includes estimating a second gradient of the second pixel signal and correcting the second pixel signal based on the second gradient, and the generating of the third corrected pixel signal includes estimating a third gradient of the third pixel signal and correcting the third pixel signal based on the third gradient.

18. A method for operating an image signal processor, the method comprising:

receiving a first pixel signal including a plurality of first pixel values, a second pixel signal including a plurality of second pixel values, and a third pixel signal including a plurality of third pixel values;

estimating a first gradient of the first pixel values, estimating a second gradient of the second pixel values, and estimating a third gradient of the third pixel values;

correcting the first pixel values based on the first gradient to generate first corrected pixel values, correcting the second pixel values based on the second gradient to generate second corrected pixel values, and correcting the third pixel values based on the third gradient to generate third corrected pixel values;

generating a first variance value based on the first pixel values, generating a second variance value based on the second pixel values, and generating a third variance value based on the third pixel values;

generating a fourth variance value based on the first corrected pixel values, generating a fifth variance value based on the second corrected pixel values, and generating a sixth variance value based on the third corrected pixel values;

determining the first pixel signal as a flat area based on a comparison result between the first variance value and the fourth variance value;

determining the second pixel signal as an edge area based on a comparison result between the second variance value and the fifth variance value; and determining the third pixel signal as a gradation area based on a comparison result between the third variance value and the sixth variance value.

19. The method of claim 18, wherein:

the third variance value is greater than the sixth variance value, and a difference between the third variance value and the sixth variance value is greater than each of: (1) a difference between the first variance value and the fourth variance value and (2) a difference between the second variance value and the fifth variance value.

20. The method of claim 18, wherein the method further comprises performing correction on the first pixel signal and the third pixel signal while not performing correction on the second pixel signal.

* * * * *